United States Patent
Kamekawa

(10) Patent No.: US 9,152,631 B2
(45) Date of Patent: Oct. 6, 2015

(54) DOCUMENT MANAGEMENT SYSTEM, METHOD FOR CONTROLLING THE SAME, AND STORAGE MEDIUM

(75) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/284,547

(22) Filed: Oct. 28, 2011

(65) Prior Publication Data

US 2012/0109915 A1 May 3, 2012

(30) Foreign Application Priority Data

Nov. 2, 2010 (JP) .................................. 2010-246428

(51) Int. Cl.
G06F 7/00 (2006.01)
G06F 17/30 (2006.01)

(52) U.S. Cl.
CPC .............................. *G06F 17/30011* (2013.01)

(58) Field of Classification Search
CPC ....... G06Q 30/06; G06Q 40/12; G06Q 10/10; G06Q 20/10; G06Q 20/40; G06Q 30/0269; H04L 63/10; H04L 29/06; H04L 47/10; H04L 47/193; H04L 69/16; G06F 17/30575; G06F 17/30286; G06F 17/30241; G06F 17/3089; G06F 17/30902; Y10S 707/99937; Y10S 707/99942; Y10S 707/99952; Y10S 707/99953

See application file for complete search history.

(56) References Cited

U.S. PATENT DOCUMENTS

| | | | | |
|---|---|---|---|---|
| 5,671,428 A * | 9/1997 | Muranaga et al. | ............ | 715/751 |
| 5,806,078 A * | 9/1998 | Hug et al. | .................... | 715/205 |
| 5,890,176 A * | 3/1999 | Kish et al. | ...................... | 715/205 |
| 5,893,908 A * | 4/1999 | Cullen et al. | .......................... | 1/1 |
| 6,289,460 B1 * | 9/2001 | Hajmiragha | ..................... | 726/28 |
| 6,477,528 B1 * | 11/2002 | Takayama | .............................. | 1/1 |
| 6,510,439 B1 * | 1/2003 | Rangarajan et al. | .......... | 715/229 |
| 6,560,620 B1 * | 5/2003 | Ching | ........................... | 715/229 |
| 7,013,426 B1 * | 3/2006 | Ingersoll | ....................... | 715/209 |
| 7,149,760 B1 * | 12/2006 | Breuer | ................................... | 1/1 |
| 8,095,876 B1 * | 1/2012 | Verstak et al. | ................. | 715/273 |
| 8,375,290 B1 * | 2/2013 | Chan et al. | ..................... | 715/229 |
| 2001/0047381 A1 * | 11/2001 | Meno et al. | ................... | 709/101 |
| 2002/0065848 A1 * | 5/2002 | Walker et al. | ................. | 707/511 |

(Continued)

FOREIGN PATENT DOCUMENTS

| JP | 2003-263350 A | 9/2003 |
|---|---|---|
| JP | 2006-092020 A | 4/2006 |

(Continued)

*Primary Examiner* — Augustine K Obisesan
(74) *Attorney, Agent, or Firm* — Canon USA, Inc. IP Division

(57) ABSTRACT

A document management system determines that a plurality of versions to be managed is a version to be stored in a file server or in a document management apparatus, the version that is determined to be stored in the file server apparatus and the property information are registered in the file server apparatus, and the version that is determined to be stored in the document management server apparatus and the property information are registered in the document management server apparatus. Information about registration destination in the version registered in the file server is stored in the document management server apparatus. Such a configuration reduces the amount of use of a storage disk in the document management server apparatus to suppress the operation cost. Even if a management system is different, a document management system capable of managing data is provided.

5 Claims, 22 Drawing Sheets

(56) References Cited

U.S. PATENT DOCUMENTS

| | | | |
|---|---|---|---|
| 2002/0161753 A1* | 10/2002 | Inaba et al. | 707/3 |
| 2002/0184257 A1* | 12/2002 | Devillers | 707/500 |
| 2003/0041304 A1* | 2/2003 | Numata et al. | 715/513 |
| 2003/0093417 A1* | 5/2003 | Kagimasa et al. | 707/3 |
| 2003/0115547 A1* | 6/2003 | Ohwada et al. | 715/511 |
| 2003/0196094 A1* | 10/2003 | Hillis et al. | 713/179 |
| 2004/0230892 A1* | 11/2004 | Horton | 715/511 |
| 2004/0230894 A1* | 11/2004 | Elza et al. | 715/511 |
| 2005/0021570 A1* | 1/2005 | Thompson | 707/200 |
| 2005/0097441 A1* | 5/2005 | Herbach et al. | 715/501.1 |
| 2005/0262089 A1* | 11/2005 | Wu | 707/10 |
| 2006/0010097 A1* | 1/2006 | Hashimoto | 707/1 |
| 2006/0095421 A1* | 5/2006 | Nagai et al. | 707/3 |
| 2006/0136511 A1* | 6/2006 | Ngo et al. | 707/203 |
| 2006/0136513 A1* | 6/2006 | Ngo et al. | 707/203 |
| 2006/0221390 A1* | 10/2006 | Tomita et al. | 358/1.15 |
| 2007/0106709 A1* | 5/2007 | Augenstein et al. | 707/203 |
| 2007/0111185 A1* | 5/2007 | Krebs | 434/350 |
| 2008/0109427 A1* | 5/2008 | Miller et al. | 707/5 |
| 2008/0133618 A1* | 6/2008 | Kawabe et al. | 707/203 |
| 2008/0178117 A1* | 7/2008 | Gelman et al. | 715/808 |
| 2008/0222216 A1* | 9/2008 | Jorden et al. | 707/203 |
| 2008/0243831 A1* | 10/2008 | Kunitake | 707/5 |
| 2008/0270380 A1* | 10/2008 | Ohrn et al. | 707/5 |
| 2009/0006408 A1* | 1/2009 | Fujikawa et al. | 707/8 |
| 2009/0024673 A1* | 1/2009 | Barker et al. | 707/203 |
| 2009/0204586 A1* | 8/2009 | Takahashi | 707/3 |
| 2010/0011032 A1* | 1/2010 | Fukuoka | 707/203 |
| 2010/0023562 A1* | 1/2010 | Kreuch et al. | 707/203 |
| 2010/0153407 A1* | 6/2010 | Krislov | 707/756 |
| 2010/0310192 A1* | 12/2010 | Kuchibhotla et al. | 382/282 |
| 2011/0029634 A1* | 2/2011 | Gimson et al. | 709/217 |
| 2011/0072272 A1* | 3/2011 | Corbin et al. | 713/176 |
| 2011/0239231 A1* | 9/2011 | Brown et al. | 719/328 |
| 2012/0323976 A1* | 12/2012 | Stidworthy et al. | 707/812 |

FOREIGN PATENT DOCUMENTS

| | | | |
|---|---|---|---|
| WO | WO 0077640 A1 | * | 12/2000 |
| WO | WO 2010098019 A2 | * | 9/2010 |
| WO | WO 2010127391 A1 | * | 11/2010 |

* cited by examiner

FIG.5

```
Document Name,"A"
Folder path,"Xyz"

Version,Created,Version comment,Version creator,Page
1,2010/9/29 16:18:23,"FIRST VERSION","Supervisor",N/A
2,2010/9/30 10:00:00,"SECOND VERSION","Admin",N/A
```

FIG.6

| DOCUMENT ID (601) | DOCUMENT NAME (602) | FILE FORMAT (603) | STORAGE PLACE (604) | |
|---|---|---|---|---|
| D001 | A | .pdf | /Xyz | ~611 |

FIG.7

| DOCUMENT ID (701) | VERSION (702) | FILE (703) | |
|---|---|---|---|
| D001 | Ver1 | (ENTITY) | ~711 |
| D001 | Ver2 | (ENTITY) | ~712 |
| D001 | Ver3 | (ENTITY) | ~713 |

FIG.8

| DOCUMENT ID (801) | VERSION (802) | PROPERTY NAME (803) | PROPERTY VALUE (804) | |
|---|---|---|---|---|
| D001 | - | CREATION DATE AND HOUR | 2010/10/01 | 811 |
| D001 | - | CREATOR | Administrator | 812 |
| D001 | - | LATEST UPDATE DATE AND HOUR | 2010/10/20 | 813 |
| D001 | - | FINAL UPDATE PERSON | User03 | 814 |
| D001 | - | INDEX | A | 815 |
| D001 | - | PAST VER PATH | \0001\0001\0001 | 816 |
| D001 | Ver1 | UPDATE PERSON | Administrator | 817 |
| D001 | Ver1 | UPDATE DATE AND HOUR | 2010/10/01 | 818 |
| D001 | Ver1 | SIZE | 1000000 BYTES | 819 |
| D001 | Ver1 | EXTENSION | .PDF | 820 |
| D001 | Ver1 | COMMENT | FIRST VERSION | 821 |
| D001 | Ver2 | UPDATE PERSON | User02 | 822 |
| D001 | Ver2 | UPDATE DATE AND HOUR | 2010/10/10 | 823 |
| D001 | Ver2 | SIZE | 1200000 BYTES | 824 |
| D001 | Ver2 | EXTENSION | .PDF | 825 |
| D001 | Ver2 | COMMENT | NEXT VERSION | 826 |
| D001 | Ver3 | UPDATE PERSON | User03 | 827 |
| D001 | Ver3 | UPDATE DATE AND HOUR | 2010/10/20 | 828 |
| D001 | Ver3 | SIZE | 1300000 BYTES | 829 |
| D001 | Ver3 | EXTENSION | .PDF | 830 |
| D001 | Ver3 | COMMENT | - | 831 |

FIG.12

| SETTING ITEM NAME | USE PLUG | SETTING VALUE | |
|---|---|---|---|
| DOCUMENT SIZE | On/Off | 3 MB | ~1211 |
| VERSION NUMBER | On/Off | 1 | ~1212 |
| STORAGE TIME PERIOD | On/Off | THREE MONTHS | ~1213 |

Columns: 1201, 1202, 1203

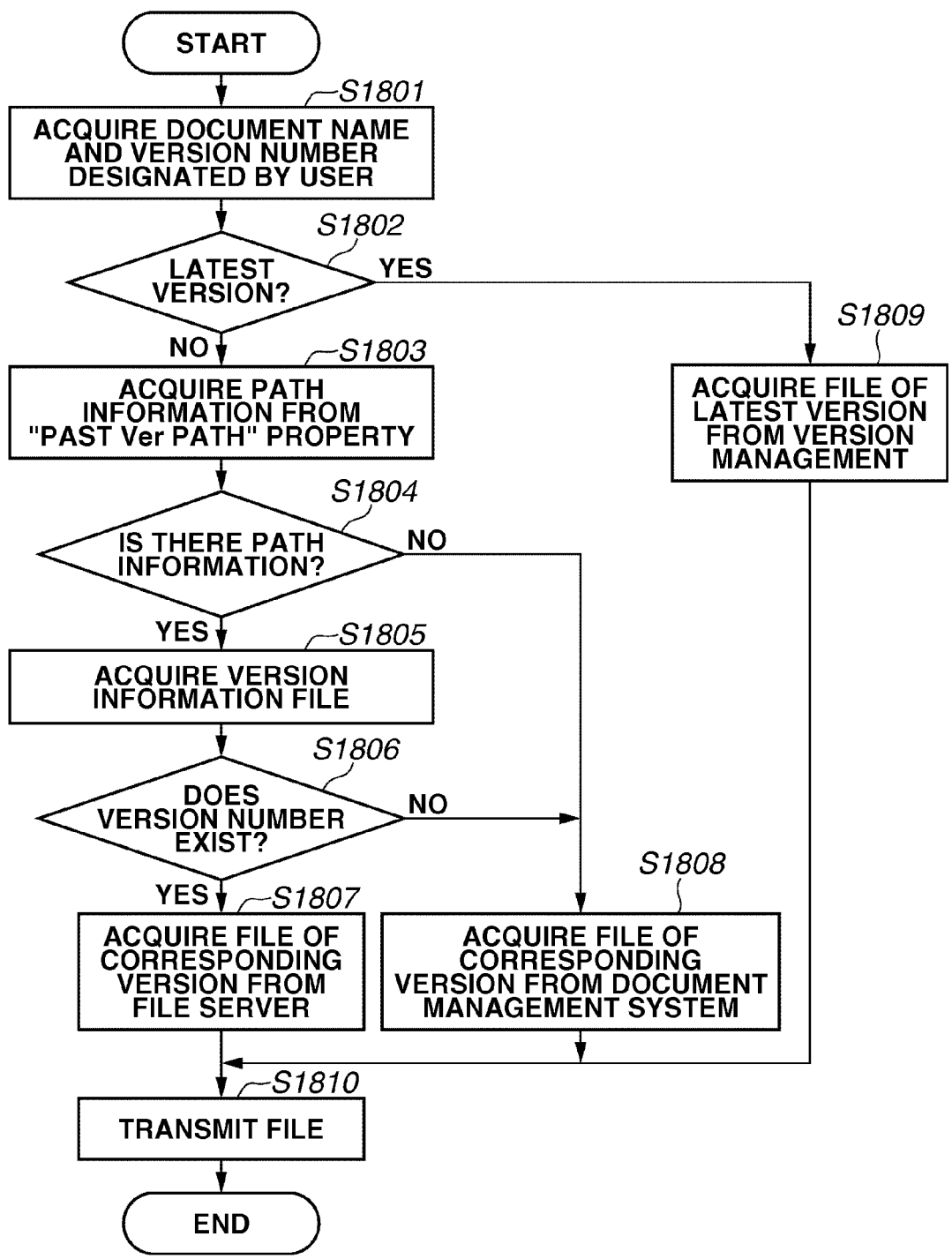

FIG.19

| DOCUMENT ID (1901) | VERSION (1902) | PROPERTY NAME (1903) | PROPERTY VALUE (1904) | |
|---|---|---|---|---|
| D001 | - | CREATION DATE AND HOUR | 2010/10/01 | 1911 |
| D001 | - | CREATOR | Administrator | 1912 |
| D001 | - | LATEST UPDATE DATE AND HOUR | 2010/10/20 | 1913 |
| D001 | - | FINAL UPDATE PERSON | User03 | 1914 |
| D001 | - | INDEX | A | 1915 |
| D001 | - | PAST VER PATH | \0001\0001\0001 | 1916 |
| D001 | Ver1 | UPDATE PERSON | Administrator | 1917 |
| D001 | Ver1 | UPDATE DATE AND HOUR | 2010/10/01 | 1918 |
| D001 | Ver1 | SIZE | 1000000 BYTES | 1919 |
| D001 | Ver1 | EXTENSION | .PDF | 1920 |
| D001 | Ver1 | COMMENT | FIRST VERSION | 1921 |
| D001 | Ver2 | UPDATE PERSON | User02 | 1922 |
| D001 | Ver2 | UPDATE DATE AND HOUR | 2010/10/10 | 1923 |
| D001 | Ver2 | SIZE | 1200000 BYTES | 1924 |
| D001 | Ver2 | EXTENSION | .PDF | 1925 |
| D001 | Ver2 | COMMENT | NEXT VERSION | 1926 |
| D001 | Ver3 | UPDATE PERSON | User03 | 1927 |
| D001 | Ver3 | UPDATE DATE AND HOUR | 2010/10/20 | 1928 |
| D001 | Ver3 | SIZE | 1300000 BYTES | 1929 |
| D001 | Ver3 | EXTENSION | .PDF | 1930 |
| D001 | Ver3 | COMMENT | - | 1931 |
| D001 | Ver3 | REAL FILE NAME | NEW_0003.DOC | 1932 |

DOCUMENT MANAGEMENT SYSTEM, METHOD FOR CONTROLLING THE SAME, AND STORAGE MEDIUM

BACKGROUND OF THE INVENTION

1. Field of the Invention

The present invention relates to a document management system capable of managing a plurality of files as the files to be brought together into versions of one document, a method for controlling the document management system, and a program.

2. Description of the Related Art

In a document management system using a database, in a case where a file to be registered is managed in the database, storage disk amount used by the database increases with operation.

The basic function of a document management system includes a function to register a plurality of files generated at an editing process of a file time-sequentially as versions to manage the files as one document (a version management function). In the version management function, generally speaking, the file format of the file registered at the time of registering a document is determined and only the file format registered first can be used when the version of the document is updated thereafter. However, there exists a system different in a management system such as a document management system having a function to update a plurality of document formats as a version.

Japanese Patent Application Laid-Open No. 2003-263350 discusses management of a version for each page of a file. More specifically, the earliest version of a page is stored in a base page area, the page subjected to a writing operation is duplicated to a version page area to perform operation and, on the other hand, the page yet to be updated refers to the page in the base page area.

In general, a disk used for the database of the document management system is expensive, so that the operation cost increases according as the amount of use of a disk for storage increases.

Furthermore, in a case where data is transferred between document management systems different in a management system, such a problem is caused that the document of all versions cannot be registered in a database depending on the specifications of a document management system to which data is transferred.

SUMMARY OF THE INVENTION

According to an aspect of the present invention, a document management system having a document management apparatus capable of managing a plurality of versions corresponding to one document and a file server which can be accessed by the document management apparatus includes a determination unit configured to determine whether each of the plurality of versions corresponding to the document managed by the document management apparatus is a version to be stored in the file server or in the document management apparatus, a registration unit configured to register the version that is determined to be stored in the file server by the determination unit and the property information of the version in the folder of the file server and register the version that is determined to be stored in the document management apparatus by the determination unit and the property information of the version in the document management apparatus, and a storage unit configured to store information about registration destination in the file server of the version registered in the file server in the document management apparatus.

According to an aspect of the present invention, the amount of use of a storage disk used for the database of the document management system is decreased to allow reducing the cost required for operating the document management system. It is possible to transfer document data between document management systems different in a version management method and perform operation after the transfer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating an example of format of a version information file stored in the file server apparatus applied to an exemplary embodiment of the present invention.

FIG. 6 is a diagram illustrating an example of data format and structure of document information.

FIG. 7 is a diagram illustrating an example of a data format and a structure of version management information.

FIG. 8 is a diagram illustrating an example of data format and structure of property management information.

FIG. 12 is a diagram illustrating an example of a data format and a structure of system setting information.

FIG. 18 is a flow chart illustrating a procedure for document file acquisition processing according to the second exemplary embodiment.

FIG. 19 is a table illustrating a data format and a structure of property management information according to a third exemplary embodiment.

DESCRIPTION OF THE EMBODIMENTS

Various exemplary embodiments, features, and aspects of the invention will be described in detail below with reference to the drawings.

It is to be understood that relative arrangement and data contents among components according to exemplary embodiments do not limit the scope of the present invention unless otherwise specified.

<General Configuration including Document Management Server>

A configuration of the entire document management system including a document management server apparatus for providing a document management system applied to the present exemplary embodiment is described below with reference to a block diagram in FIG. 1.

Figure 1:
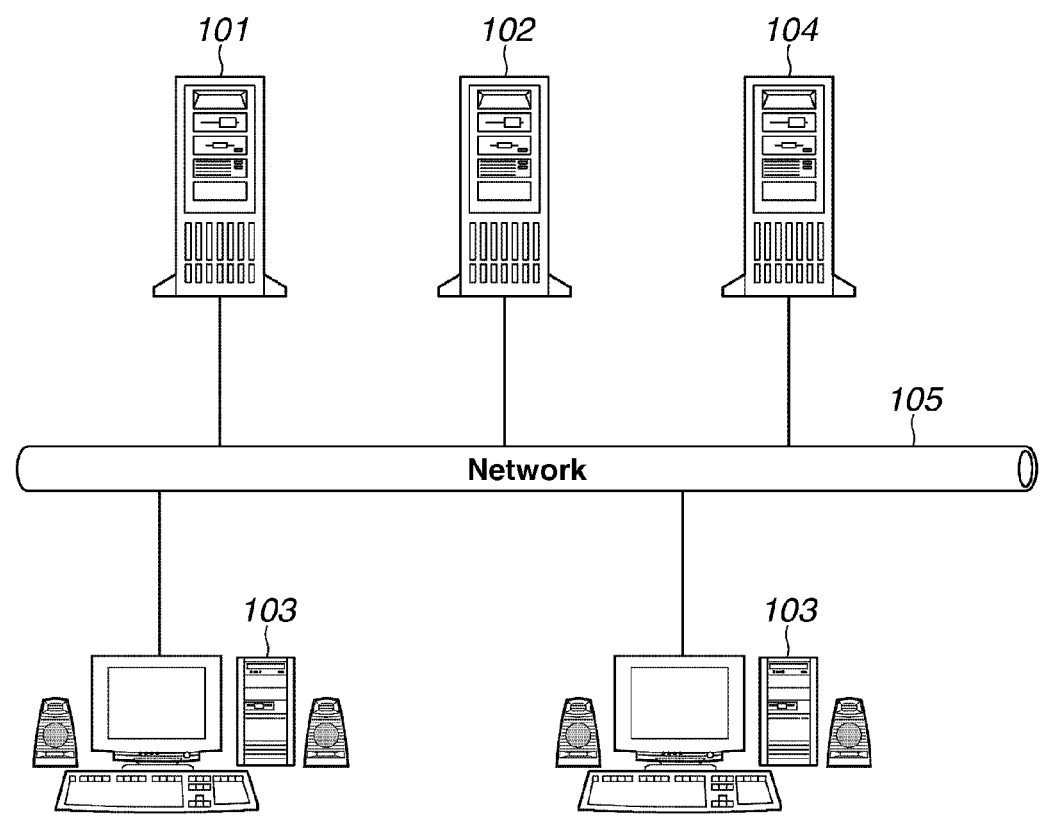
FIG. 1 is a block diagram illustrating a configuration of the entire system applied to an exemplary embodiment of the present invention.

As illustrated in FIG. 1, the document management system includes a document management server apparatus 101, a file server apparatus 102, a client apparatus 103, an old document management server apparatus 104, and a network 105. In the present exemplary embodiment, an example is described in which data managed by the old document management server apparatus 104 is transferred to the document management server apparatus 101 providing the document management system related to the present invention.

The document management server apparatus 101 has a function to manage documents by versions and provides managing document information and file in response to a request from the client apparatus 103. The configuration of the document management server apparatus 101 will be described below with reference to FIG. 2.

The file server apparatus 102 has a function to control the input and output of a file, and can manage a file with a hierarchical structure of a folder. The file server apparatus 102 can be accessed by the above document management server apparatus 101, and is used for managing the file registered from the client apparatus 103 by the access of the document management server apparatus 101.

The file server apparatus 102 has functions of a general file server such as those of input and output of a file from and to the document management server apparatus 101 via the network, and the generation/deletion of a folder.

The client apparatus 103 is an information processing apparatus such as a client PC, and has a window function to display and operate the document information of the document management server apparatus 101. As illustrated above, the present invention does not limit the number of the client apparatus 103 to one in the network 105. A plurality of the client apparatuses 103 may exist therein. Alternatively, the client apparatus 103 may be formed by apparatus different in ability.

The client apparatus 103 is a general personal computer, and can communicate with the document management server apparatus 101 via the network 105 to play a role as a terminal for accessing the stored document information. The client apparatus 103 has functions to display data supplied from the document management server apparatus 101, store acquired document files in any place, and browse acquired files.

The old document management server apparatus 104 has a function to manage documents by versions, but is different in the management system of the versions from the document management server apparatus 101. The old document management server apparatus 104 is a source of transferring document data to the document management server apparatus 101, and is not required in view of the system configuration after the transfer of data.

The document management server apparatus 101 can communicate with the file server apparatus 102, the client apparatus 103, and the old document management server apparatus 104 bidirectionally via the network 105. The network 105 is a network system such as Ethernet (registered trademark), and is realized as a local area network (LAN), a wide area network (WAN), and the Internet.

<Configuration of Document Management Server Apparatus>

The document management server apparatus 101 is a personal computer for a sever, and an image processing apparatus formed of hardware such as a central processing unit (CPU), a random access memory (RAM), a read only memory (ROM), a hard disk drive (HDD), and a network interface card (hereinafter referred to as NIC).

The document management server apparatus 101 is connected with an external or an internal display (hereinafter referred to as CRT), a key board (hereinafter referred to as KB), and a mouse (hereinafter referred to as MOUSE) to perform user's input and output control.

Figure 2:
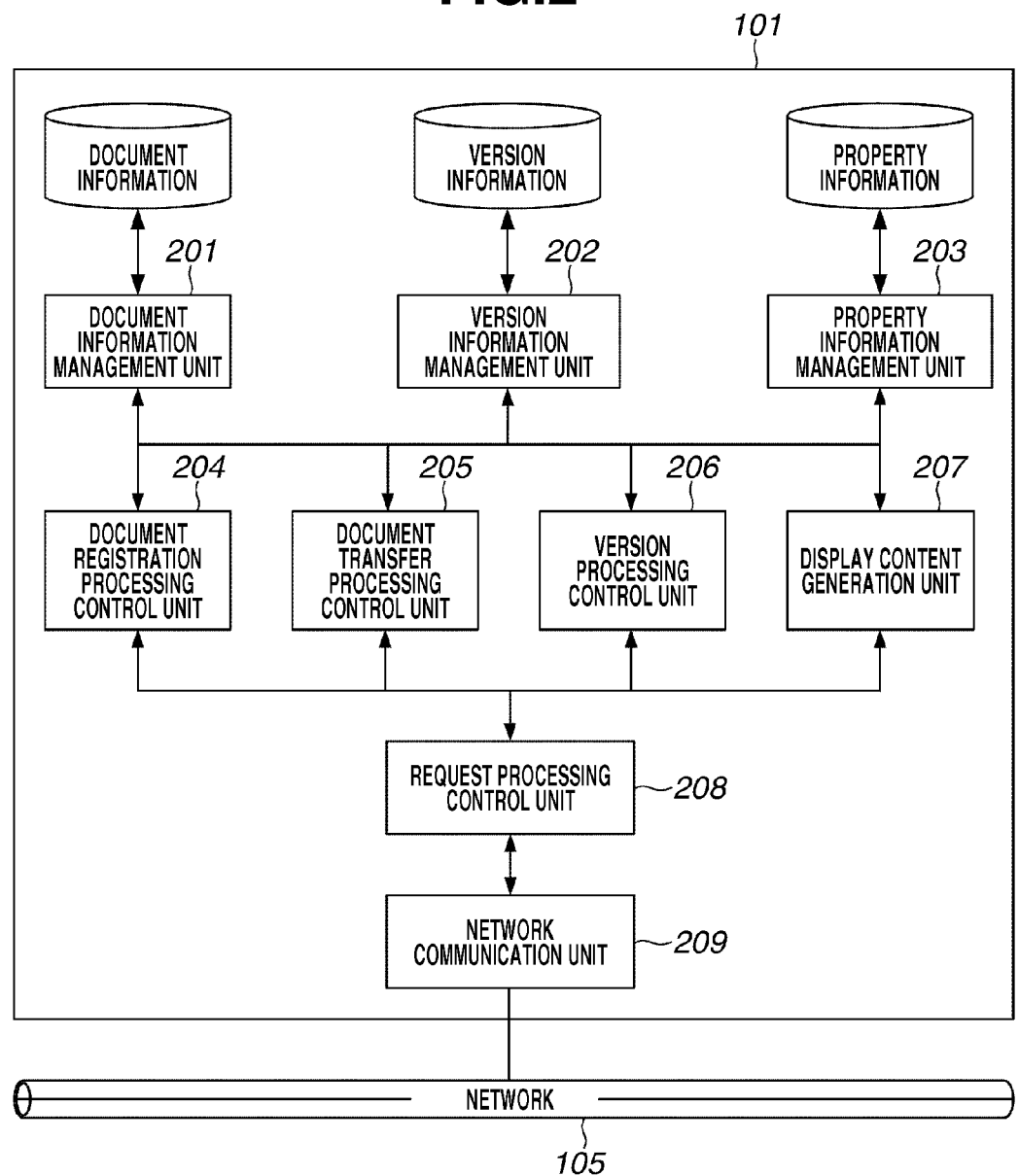
FIG. 2 is a block diagram illustrating a physical configuration of a document management server apparatus applied to an exemplary embodiment of the present invention.

The functional configuration of the document management server apparatus 101 is described below with reference to FIG. 2. As illustrated in FIG. 2, the document management server apparatus 101 includes a portion used inside and a portion for receiving processing from the external. The portion used inside includes a document information management unit 201, a version information management unit 202, and a property information management unit 203.

The portion for receiving processing from the external includes a document registration processing control unit 204, a document transfer processing control unit 205, a version processing control unit 206, a display content generation unit 207, a request processing control unit 208, and a network communication unit 209.

The document information management unit 201 is realized by the CPU that executes a program stored in the RAM, and performs the input and the output processing of document information. The document information management unit 201 stores the document information in the area using the RAM or the HDD.

The version information management unit 202 is realized by the CPU that executes a program stored in the RAM, and performs the input and the output processing of version information. The version information management unit 202 stores the user information in the area using the RAM or the HDD.

The property information management unit 203 is realized by the CPU that executes a program stored in the RAM, and performs the input and the output of property information.

The property information management unit 203 stores the property information in the area using the RAM or the HDD.

The document registration processing control unit 204 is realized by the CPU that executes a program stored in the RAM, and controls request processing related to the registration of document transmitted from the client apparatus 103. The document registration processing control unit 204 performs processing using the document information management unit 201.

The document transfer processing control unit 205 is realized by the CPU that executes a program stored in the RAM, and performs document transfer processing from the old document management server apparatus 104. The document transfer processing control unit 205 performs processing using the document information management unit 201, the version information management unit 202, and the property information management unit 203.

The version processing control unit 206 is realized by the CPU that executes a program stored in the RAM, and performs the control of version list acquisition processing from the client apparatus 103 and version file acquisition processing.

The version processing control unit 206 performs processing mainly using the version information management unit 202 and the property information management unit 203. The version processing control unit 206 communicates with the file server apparatus 102, and performs the input and output processing of a document file written in version and property information.

The display content generation unit 207 is realized by the CPU that executes a program stored in the RAM, and performs the control of processing for generating/shaping display information for transmitting processing results at other processing control units. In the present exemplary embodiment, information is transferred via a web browser, so that display information supposedly use a hyper text markup language (HTML) format or a simple object access protocol (SOAP) format.

The request processing control unit 208 is realized by the CPU that executes a program stored in the RAM, a place where a request transmitted from a client is first received from the network communication unit 209 described below, and subjects all requests to a primary processing.

The request processing control unit 208 requests the document registration processing control unit 204, the document transfer processing control unit 205, and the version processing control unit 206 to perform the processing according to the request contents.

The network communication unit 209 controls communication in such a manner that the request processing control unit 208 is notified of the requests for the processing received from the client apparatus 103 and the old document management server apparatus 104, and the processing results are sent back to each source that requests the processing.

The network communication unit 209 controls the transmission of requesting the file server apparatus 102 to perform processing. The network communication unit 209 represents a network information center (NIC) of the document management server apparatus 101 and is connected to a network 105.

<Document Management Structure>

Figure 3:
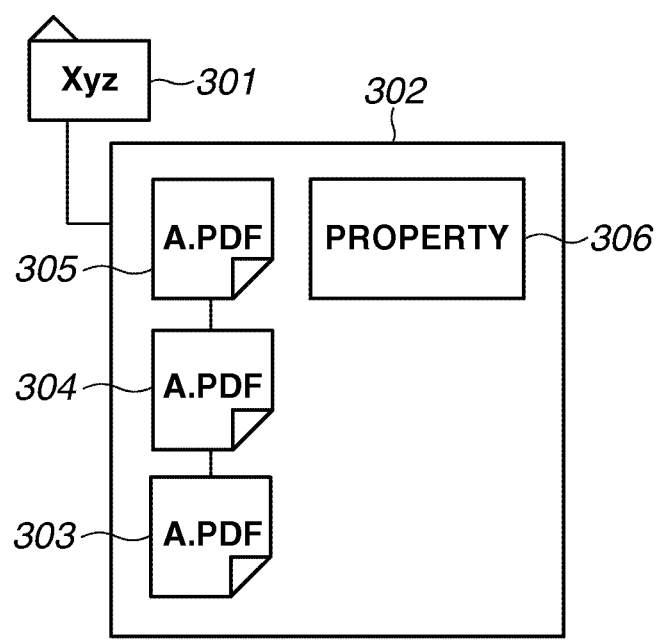
FIG. 3 is a diagram illustrating concept of version management applied to an exemplary embodiment of the present invention.

FIG. 3 is a schematic diagram illustrating the concept of version management in the document management server apparatus 101. FIG. 3 illustrates the logical structure of a document managed by the document management server apparatus 101. The document information of the document management server apparatus 101 includes a folder 301 for storing documents, document concept (i.e. document group) 302, files 303 to 305, and property 306.

The folder 301 is an element for configuring a logical hierarchy structure, and can be formed by a plurality of hierarchies. In the present exemplary embodiment, since the folder 301 does not need to be configured in the plurality of hierarchies, description is made using a single folder.

The document concept 302 is a concept for storing a plurality of files, performs time-series management of the stored files in the form of versions, and also manages property values stored for each version of files (documents).

The files 303 to 305 are stored in the document concept 302. The figure illustrates that the files 303, 304, and 305 are managed in this order as versions 1, 2, and 3.

The file 305 is the latest in version among other files, and the files 303 and 304 are past versions. The property 306 represents a property value to be stored in units of the document concept 302 or the files.

<Folder Structure in File Server>

Figure 4:
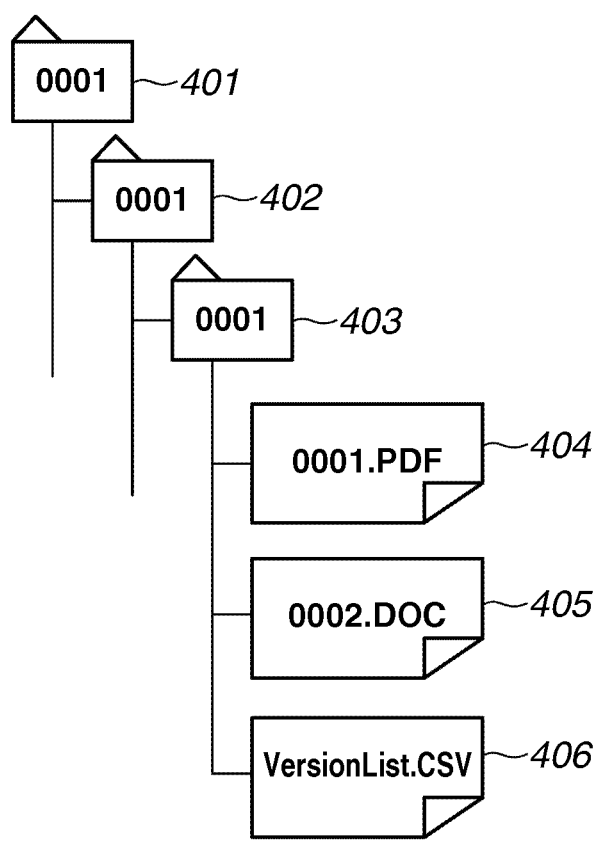
FIG. 4 is a diagram illustrating concept of a folder structure in a file server apparatus applied to an exemplary embodiment of the present invention.

FIG. 4 is a schematic diagram illustrating the concept of the folder structure on the file server apparatus 102. On the file server apparatus 102, a folder is created in units of the document concept 302 and the file concerned with the document concept 302 is arranged in the created folder.

In the present exemplary embodiment, folders 401, 402, and 403 have relationship of hierarchical structure with one another. The folder 403 of the bottom layer is the one that represents document concept. The folder 403 stores the files of versions which are not managed by the document management server apparatus 101 (i.e. the files 404 and 405 correspond thereto). The files 404 and 405 are named a unique file name and managed. In the present exemplary embodiment, a version number is taken as a file name.

A version information file 406 manages file information in the folder 403, and stores the file names of the files 404 and 405 and the property information stored for each version associated with the files.

FIG. 5 illustrates an example of the version information file 406, in which the following information is written. "Document Name" is information indicating a document name. "Folder path" is information indicating a folder path that stores document concept in the document management server apparatus 101. "Version Created," "version comment," "version creator," and "page" are file information corresponding to each file. The above pieces of information represent "version number," "version creation date and hour," "version comment," "version creator," and "page number" respectively.

<Format of Data to be Handled and Structure>

The data structure for realizing a logical structure of the version management illustrated in FIG. 3 is described with reference to FIGS. 6 to 8.

FIGS. 6 to 8 illustrate the format of data and the example of data handled by the document management server apparatus 101 illustrated in FIG. 2. The information illustrated below indicates the minimum items for representing the present invention, so that other items may be added if required.

The document information in FIG. 6 indicates the format of information stored in units of documents and includes a document ID 601, document name 602, file format 603, and storage place 604. The table in FIG. 6 is used as document information handled by the document information management unit 201 of the document management server apparatus 101 illustrated in FIG. 2.

The document ID 601 is information for uniquely representing document information 611. The document name 602 is information for representing a displayed name of the document represented by the document ID 601. The file format 603 is information for indicating a file extension of the document represented by the document ID 601.

The storage place 604 is information for representing a folder in which the document represented by the document ID 601 is registered. The document information 611 expresses actual document information corresponding to the document concept 302 in FIG. 3. In the present exemplary embodiment, for the sake of simplification of description, only a single piece of document information is illustrated, however, the document information corresponding to the number of documents managed by the document management server apparatus 101 is managed.

FIG. 7 represents an example of the versions associated with the document indicated by the document ID 601 and version information being information such as files corresponding to the versions, and includes a document ID 701, version 702, and file 703 in the present exemplary embodiment. The table in FIG. 7 is used as version information handled by the version information management unit 202 of the document management server apparatus 101.

The document ID 701 represents a relationship with the document information in FIG. 6, and indicates that any of IDs (i.e., documents) existing in the document ID 601 is used. The version 702 represents a version number in the document indicated by the document ID 701, and stores a unique value (ver 1 or ver 2, for example) in the information with the same document ID 701.

The file 703 represents a file indicated by the document version made unique by the document ID 701 and the version 702, and the entity of the file is stored in this information.

The document ID 701 is combined with the version 702 to enable version information 711 to 713 to be unique represented. Actual version information 711, 712, and 713 represent the files 303, 304, and 305 in FIG. 3 respectively.

FIG. 8 represents examples of the document represented by the document ID 601 and property information corresponding to each version included in the document. In the present exemplary embodiment, the property information includes a document ID 801, version 802, property name 803, and property value 804. The table in FIG. 8 is used as property information handled by the property information management unit 203 of the document management server apparatus 101.

The document ID 801 represents a relationship with the document information in FIG. 6, and indicates that any of IDs (i.e., documents) existing in the document ID 601 is used.

The version 802 represents a relationship with the version information in FIG. 7, and any of version numbers existing in the version 702. However, for the property information included in the document itself, as written in rows 811 to 816, values other than the version numbers can be used for the version 802.

The property name 803 represents property type of the document or the version. The property value 804 represents the property value made unique by the combination of the document ID 801, the version 802, and the property name 803, and stores values for each document or version.

In the present exemplary embodiment, property information 811 to 816 represent values set to the document itself, and the property information 817 to 831 represent values set to each version.

<Transfer Processing of Document Management Server>

Figure 9:
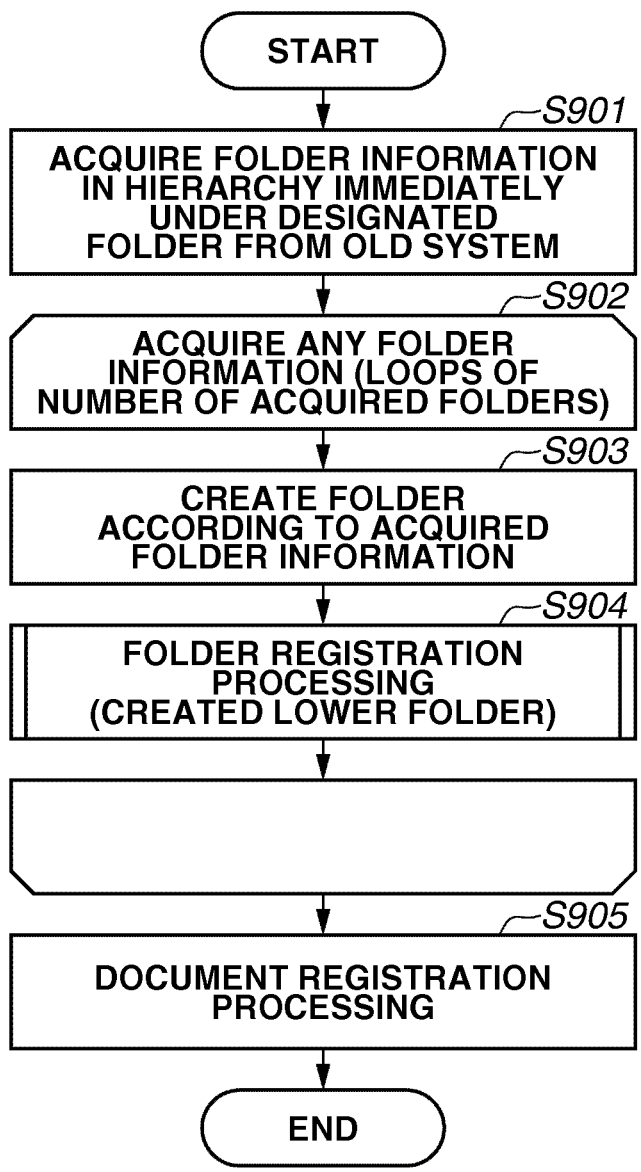
FIG. 9 is a flow chart illustrating a procedure for data transfer processing according to a first exemplary embodiment.
Figure 10:
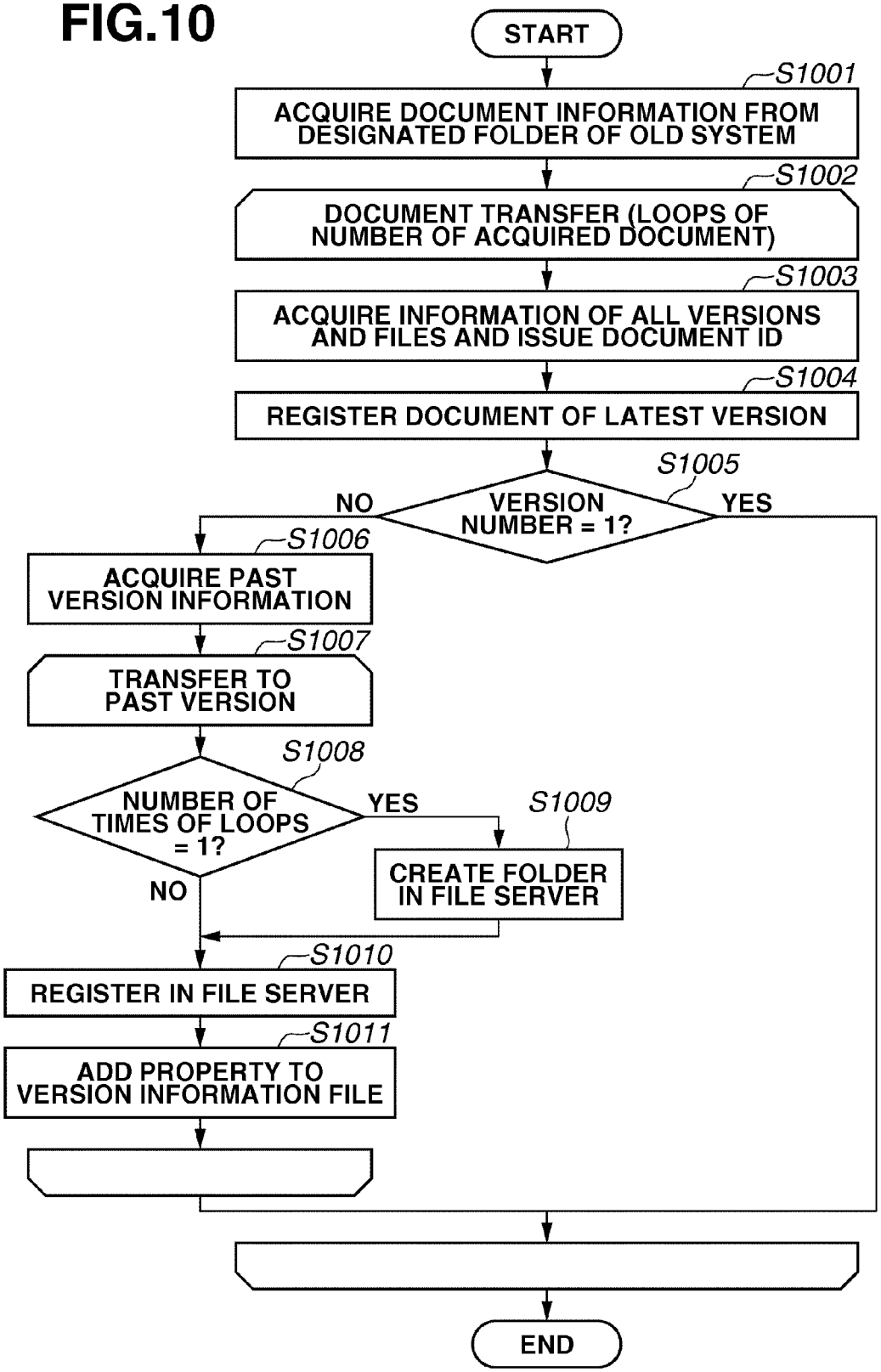
FIG. 10 is a flow chart illustrating a procedure for document registration processing according to the first exemplary embodiment.

A document transfer processing procedure for transferring the documents stored in the old document management server apparatus 104 to the document management server apparatus 101 is described below with reference to FIGS. 9 and 10. FIG. 9 is a flow chart illustrating the general flow of the document transfer processing, from which the document registration processing in FIG. 10 is called.

The processing is executed by the document transfer processing control unit 205 instructed by the request processing control unit 208 by the CPU of the document management server apparatus 101 executing various execution programs stored in the RAM.

In step S901, the document transfer processing control unit 205 acquires the folder information of a folder existing in the low order of the folder designated as the folder to be transferred from the folders existing in the old document management server apparatus 104, and stores the folder information in the RAM.

In step S902, the document transfer processing control unit 205 acquires folder information at any layer among the folder information stored in the RAM. Thereafter, steps S902 to S904 are repeated until all of the folder information of the folder existing in the lower orders than the folder to be transferred is processed. The processing proceeds to step S905 after all of the folder information is processed.

In step S903, the document transfer processing control unit 205 acquires a folder name from the folder information acquired in step S902 to create a folder in the document management server apparatus 101 using the folder name.

In step S904, the document transfer processing control unit 205 registers the created folder in the document management server apparatus 101, and indicates the folder acquired in step S902. If the folder information still exists, the processing returns to step S902 to transfer the lower hierarchy.

The completion of processing in step S904 means that the transfer of the hierarchy of the folder acquired in step S902 is completed, so that the processed folder information is deleted from the RAM, and the processing returns to step S902.

In step S905, the document transfer processing control unit 205 calls the processing flow to be described below in FIG. 10, and performs document registration processing directly under the indicated folder. After the processing in step S905 is ended, the flow of the present processing is ended.

FIG. 10 is a flow chart illustrating in detail the document registration processing in step S905 in FIG. 9, and represents a detailed processing for transferring the document existing immediately under the indicated specific folder in the old document management server apparatus 104 to the document management server apparatus 101. The present processing is executed in the document transfer processing control unit 205 instructed by the CPU of the document management server apparatus 101 via the request processing control unit 208.

In step S1001, the document transfer processing control unit 205 acquires from the old document management server apparatus 104 a list (document information) existing in the folder indicated as the folder to be transferred, and stores the acquired document information in the RAM.

In step S1002, the document transfer processing control unit 205 acquires one piece of the document information stored in the RAM, and the processing proceeds to step S1003. After that, the processing from steps S1003 to S1011 is looped until all of document information is processed. If there is no document information to be acquired, the processing is ended.

In step S1003, the document transfer processing control unit 205 acquires information of all versions and a file of each version of the document corresponding to the document information acquired in step S1002 from the old document management server apparatus 104, and issues the document ID that is unique in the document management server apparatus 101. Furthermore, the document transfer processing control unit 205 stores the acquired version information, file, and the issued document ID in the RAM. Then, the processing proceeds to step S1004.

In step S1004, the document transfer processing control unit 205 acquires the version whose number is the largest in the version information stored in the RAM as the latest version, and registers the information in the document management server apparatus 101. The information is registered in the document information management unit 201, the version information management unit 202, and the property information management unit 203 based on the document ID issued in step S1003 using the version information and the file stored in the RAM.

Thus, one piece of data is registered in the document information in FIG. 6, one piece of data is registered in the version information in FIG. 7, and eleven pieces of data are registered in the property information in FIG. 8. At this point, "past Ver path" being the property of the document itself in the property information is registered with a setting value kept blank.

In step S1005, the document transfer processing control unit 205 determines whether the number of the version information acquired in step S1003 is one or not. If the document transfer processing control unit 205 determines that the number of the version information is two or more (NO in step S1005), the processing proceeds to step S1006. If the document transfer processing control unit 205 determines that the number of the version information is one (YES in step S1005), the processing returns to step S1002, which is the top of the loop processing to perform the processing of the next document.

In step S1006, the document transfer processing control unit 205 acquires a list of the past version (the past version information) except the latest version from the version information stored in the RAM.

In step S1007, the document transfer processing control unit 205 selects any one of the version information from among the acquired past version information. If there is no version information to be selected, the transfer of all the version information for one document is ended, the processing leaves the processing loop and returns to step S1002 to start the transfer processing of the next document.

In step S1008, the document transfer processing control unit 205 counts the number of times of the loop processing from steps S1007 to S1011. If the number of times of the loop processing is the first loop processing (YES in step S1008), the processing proceeds to step S1009. If the number of times of the loop processing is the second or more loop processing (NO in step S1008), the processing proceeds to step S1010.

In step S1009, the document transfer processing control unit 205 creates a folder for storing the past version included in the document to be transferred in the file server apparatus 102. As illustrated in FIG. 4, the folder for a document is created as any bottom folder in the prescribed created folder hierarchy.

The document transfer processing control unit 205 creates path information for accessing the created folder hierarchy on the file server apparatus 102, and registers the created path in the property name "past Ver path" in the property value created in step S1004.

Furthermore, the document transfer processing control unit 205 creates the version information file 406 illustrated in FIG. 4, and adds a document portion (document name and the path of the document management server apparatus 101) to the created folder.

In step S1010, the document transfer processing control unit 205 performs the registration processing of the file represented by the selected version information in the file server apparatus 102.

The file matching the selected version information is acquired from the RAM and stored under the folder created in step S1007. The file name at the time of storing the file is determined in such a manner that the version number is used as a character string and an extension of the document is added thereto.

In step S1011, the document transfer processing control unit 205 outputs the version information to the version information file 406 in the format illustrated in FIG. 8 using the file name stored in step S1010 and the version information acquired in step S1006.

<Document Management Screen after Transfer>

Figure 11:
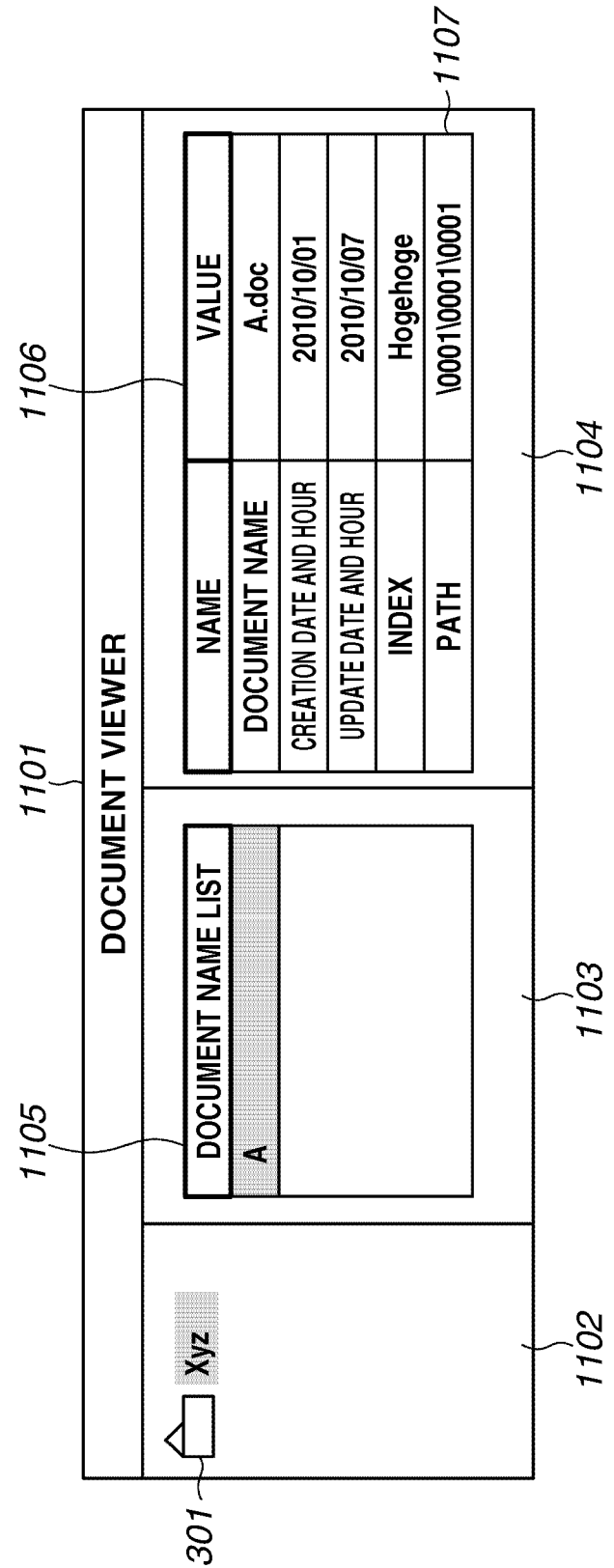
FIG. 11 is a diagram illustrating an example of document management screen after transfer according to the first exemplary embodiment.

The screen for displaying the document information of the document management server apparatus 101 displayed on the CRT of the client apparatus 103 after transfer is described below with reference to FIG. 11. A document management screen 1101 in FIG. 11 includes the following components.

A folder tree display unit 1102 is an area for displaying the logical folder hierarchy structure of the document managed by the document management server apparatus 101, and represents the folder hierarchy (the folder 301) illustrated in FIG. 3. The present exemplary embodiment uses one folder, but, actually, the folder tree display unit 1102 may display the folder structure with a plurality of hierarchies. The selection of the folder 301 (a shaded region in the figure) displays the document information in the selected folder on a document list display unit 1103.

The document list display unit 1103 includes a document name list 1105. The document name list 1105 has a function to display the list of the documents stored in the folder selected by the folder tree display unit 1102. The document list acquired by the document information management unit 201 is displayed at the timing at which the folder is selected by the folder tree display unit 1102.

A property display unit 1104 includes a property list 1106. The property list 1106 has a function to display the property list of the document selected in the document name list 1105.

The property information of the property information management unit 203 in the document management server apparatus 101 is acquired by the timing at which any document is selected in the document name list 1105 and displayed on the property list 1106.

The property displayed here displays the value registered in the document itself, so that only the information without version number in the version 802 in FIG. 8 is displayed. For the document name displayed on the list, the document name acquired from the document name 602 in FIG. 6 is displayed.

In the property list 1106, link (registration destination) to the past version information registered in the file server apparatus 102 in the transfer processing flow is represented in the format of 1107 in the figure. This allows the user to know an access path at the time of accessing the file server apparatus 102 to enable the acquisition of the past version file.

A second exemplary embodiment according to the document management system of the present invention is described below. The second exemplary embodiment illustrates operation after transition from other systems in the first exemplary embodiment or operation at the time of newly performing operation. The present exemplary embodiment is characterized in that the threshold of a version management is set to a system to allow flexibly changing a management turning point between a database and a file server.

In the present exemplary embodiment, the old document management server apparatus 104 is not required as the system configuration illustrated in FIG. 1. The operational system is configured by the document management server apparatus 101 and the file server apparatus 102. In the second exemplary embodiment, only difference from the first exemplary embodiment is described, so that the portions that are not specified in particular are similar to those of the first exemplary embodiment in configuration/procedure.

<System Setting Information>

FIG. 12 illustrates an example of system setting information such as threshold used as a condition for segmenting the document between the document management server apparatus 101 and the file server apparatus 102. The system setting information represents the format of information stored in the document management server apparatus 101 and includes a setting item name 1201, a use flag 1202, and a setting value 1203.

The setting item name 1201 is information representing an item for indicating a system setting value. The use flag 1202 is information representing a state as to whether the setting value indicated by the setting item name 1201 is used. The use flag 1202 stores information "On" or "Off." The setting value 1203 is information representing the setting value indicated by the setting item name 1201. The unit and the format of a value set by each setting value are different.

The items stored as actual information are represented by 1211 to 1213. A threshold 1211 depends on the document size. The setting value "3 MB" in FIG. 12 means that a past version whose file size exceeds 3 MB is transferred to the file server apparatus 102.

A threshold 1212 depends on version number. The setting value "1" in FIG. 12 means that a past version which exceeds one generation is transferred to the file server apparatus 102.

A threshold 1213 depends on storage time period. The setting value "3 months" in FIG. 12 means that a past version in which three months have passed since registration is transferred to the file server apparatus 102. The setting values in FIG. 12 are merely examples. It is desirably possible for the user to set the setting values according to the operation of the document management.

<Document Management Screen>

Figure 13:
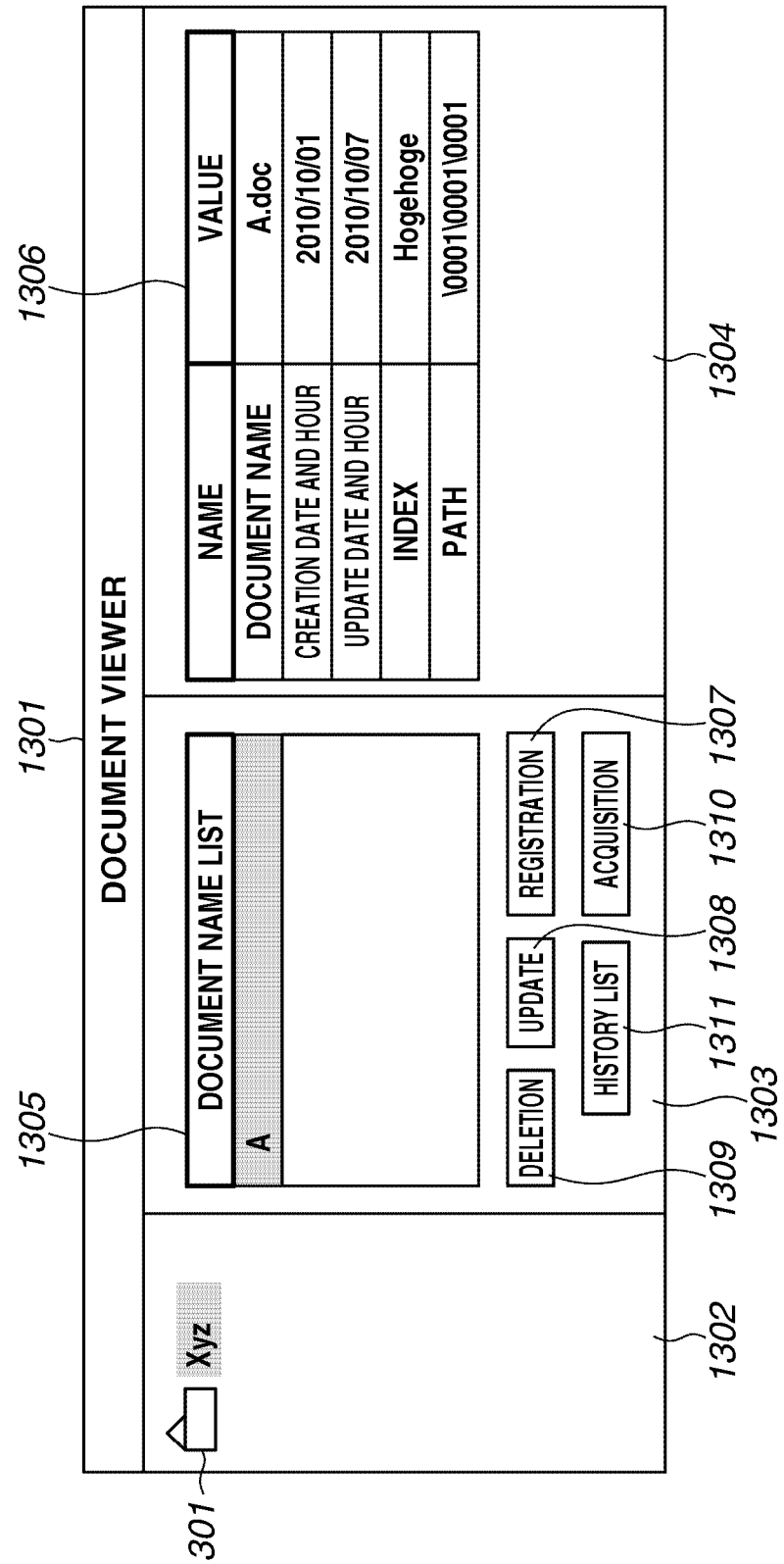
FIG. 13 is a diagram illustrating an example of a document management screen according to a second exemplary embodiment.

FIG. 13 is an example of a screen for displaying document information of the document management server apparatus 101 displayed on the CRT of the client apparatus 103. In a document management screen 1301 in FIG. 13, a folder tree display unit 1302 and a property display unit 1306 are similar to those in FIG. 11 except a document list display unit 1303, so that the description thereof is omitted herein.

The document list display unit 1303 includes a document name list 1305, a registration button 1307, an update button 1308, a deletion button 1309, an acquisition button 1310, and a history list button 1311. The document name list 1305 is similar to the document name list 1105 in FIG. 11.

The registration button 1307 is the one used to register a new document in the folder selected by the folder tree display unit 1302. The registration button 1307 is pressed to perform the document management processing using the process flow illustrated in FIG. 15. The update button 1308 is the one that updates the version of the document selected in the document name list 1305. The update button 1308 is pressed to perform the document update processing using the process flow illustrated in FIG. 16.

The deletion button 1309 is the button used to subject the document selected in the document name list 1305 to the document deletion processing. The deletion button 1309 is pressed to perform the document deletion processing using the process flow illustrated in FIG. 17.

The acquisition button 1310 is the button used to acquire a file of the latest version of the document selected in the document name list 1305. The acquisition button 1310 is pressed to perform the file acquisition processing using the process flow illustrated in FIG. 18.

The history list button 1311 is the button used to browse the history of versions of the document selected in the document name list 1305. The history list button 1311 is pressed to display the version management screen illustrated in FIG. 14.

<Version Management Screen>

Figure 14:
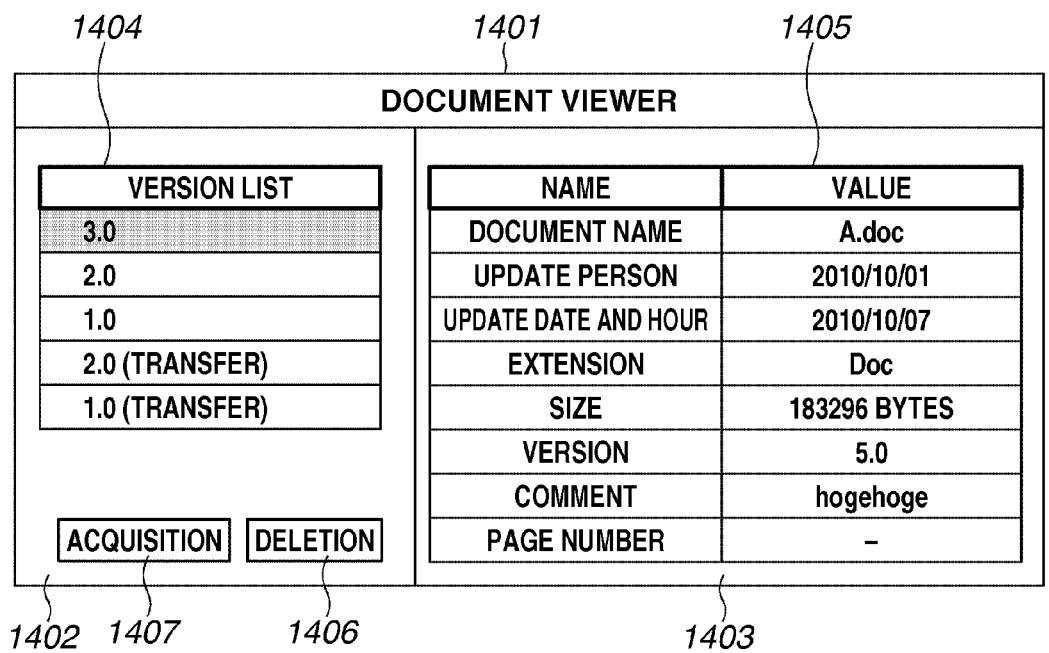
FIG. 14 is a diagram illustrating an example of a version management screen according to the second exemplary embodiment.

FIG. 14 is an example of a version management screen for displaying version information of the document management server apparatus 101 displayed on the CRT of the client apparatus 103. A version management screen 1401 in FIG. 14 includes the following components.

A version list display unit 1402 includes a version list 1404, a deletion button 1406, and an acquisition button 1407. The version list 1404 is an area where a list of versions of the document selected in the document name list 1305 in FIG. 13 is displayed.

The versions to be displayed thereon include not only the versions managed by the version information management unit 202 in the document management server apparatus 101 but also the versions stored in the folder on the file server apparatus 102 designated by the "past Ver path" property.

Version information is added to the display list by the following two processes when the screen is acquired. The display content generation unit 207 acquires the version list of the document from the version information management unit 202, and adds the version list to the display list. The display content generation unit 207 acquires the property value of "past Ver path" of the document from the property information management unit 203.

In a case where path information is stored as the acquired property value, the display content generation unit 207 acquires the version information file 406 underlying the folder written in the path information from the file server apparatus 102. The display content generation unit 207 acquires the version information written in the file, and add the version information to the display list.

When any version is selected from the version list displayed on the version list 1404, the property information of the version is displayed on a version property display unit 1403.

A version property display unit 1403 is an area for displaying the property value stored for each version, and includes a property list 1405. The property list 1405 is an area for displaying the property information related to the version selected in the version list 1404, and is acquired and displayed using any of the following processing according to the place where the version is stored.

The display content generation unit 207 confirms whether the selected version number exists in the version information management unit 202 of the document management server apparatus 101. If the selected version number exists therein, the display content generation unit 207 acquires the property information corresponding to the designated document/version from the property information management unit 203. If the selected version number does not exist therein, the display content generation unit 207 acquires the data row corresponding to the version selected from the version information file 406 and divides the data row into each property value.

In the version management screen 1401, two buttons for subjecting the version to processing are held on the version list display unit 1402. A deletion button 1406 is the button used to delete the version selected in the version list 1404. The deletion button 1406 is pressed to perform the version deletion processing using the process flow illustrated in FIG. 17.

The acquisition button 1407 is the button used to acquire the file of the version selected by the version list 1404. The acquisition button 1407 is pressed to perform the file acquisition processing using the process flow illustrated in FIG. 18.

<Document Registration Processing>

Figure 15:
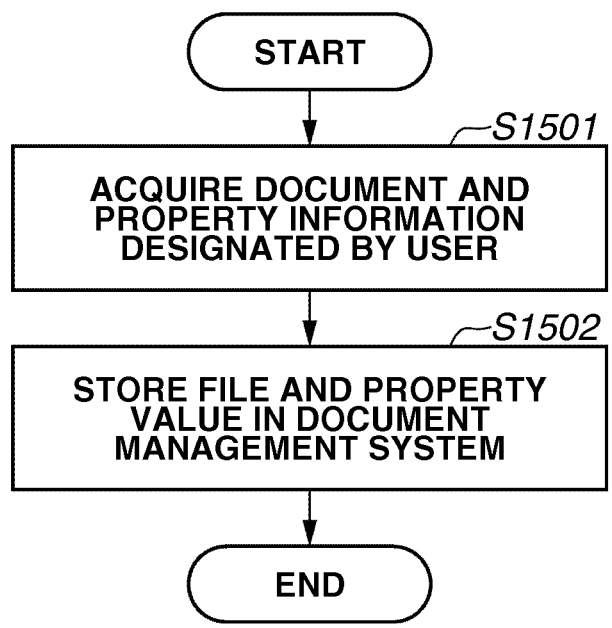
FIG. 15 is a flow chart illustrating a procedure for new document registration processing according to the second exemplary embodiment.

A procedure for registration processing of a new document by the document management server apparatus 101 is described below with reference to FIG. 15. FIG. 15 illustrates the process flow in pressing the registration button 1307 in a state where any folder displayed on the folder tree display unit 1302 in the document management screen 1301 displayed on the CRT of the client apparatus 103 is selected. The present processing is executed by the document registration processing control unit 204 instructed by the CPU of the document management server apparatus 101 via the request processing control unit 208.

In step S1501, the document registration processing control unit 204 acquires the new registration document file and property information designated by the user, and stores them in the RAM. In step S1502, the document registration processing control unit 204 registers the acquired document file and property information. The registration processing is described in detail below.

The document registration processing control unit 204 issues a new document ID, and stores document information in the document information management unit 201 using the document ID. The document registration processing control unit 204 registers the document file acquired in step S1501 in the version information management unit 202 with the issued document ID and "Ver 1" as unique information.

The document registration processing control unit 204 registers the property value of the document itself and the property value stored as a version in the property information management unit 203 using the property information acquired in step S1501. When the above processing is performed and the registration processing in the document information management unit 201, the version information management unit 202, and the property information management unit 203 are completed, the present flow is ended.

<Document Update Processing>

Figure 16:
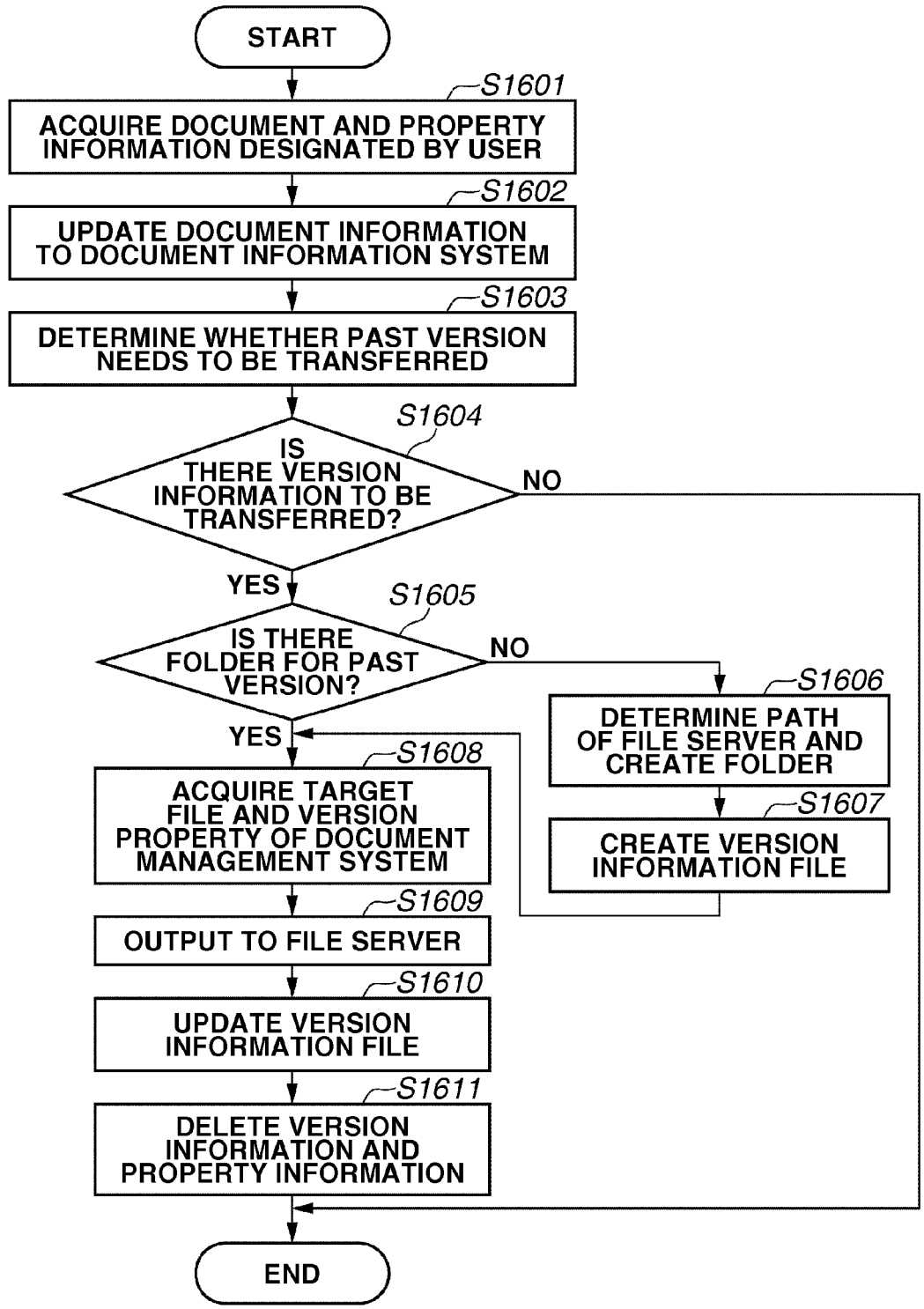
FIG. 16 is a flow chart illustrating a procedure for document update processing according to the second exemplary embodiment.

A procedure for update processing of a document by the document management server apparatus 101 is described below with reference to FIG. 16. FIG. 16 illustrates the processing flow in pressing the update button 1308 in a state where any document displayed on the document name list 1305 in the document management screen 1301 displayed on the CRT of the client apparatus 103 is selected. The present processing is executed in the version processing control unit 206 instructed by the CPU of the document management server apparatus 101 via the request processing control unit 208.

In step S1601, the version processing control unit 206 acquires the update document file and property information designated by the user, and stores them in the RAM. In step S1602, the version processing control unit 206 performs the update processing of document information for the document management server apparatus 101 using the following procedure.

The version processing control unit 206 acquires the latest version number managed by the document designated by the user in the version information management unit 202, and generates a version number to be added from the latest version number. For example, if the latest version number is "Ver 3.0," the version number to be added is "Ver 4.0."

The version processing control unit 206 registers the document file acquired in step S1601 in the version information management unit 202 with the document ID designated by the user and the generated latest version number as unique information.

The version processing control unit 206 registers the property value stored as a version in the property information management unit 203 using the property information acquired in step S1601. After the registration processing in the version information management unit 202 and the property information management unit 203 is ended, the processing proceeds to step S1603.

In step S1603, the version processing control unit 206 reads the system setting information in FIG. 12, and determines whether the past version is transferred to the file server apparatus 102 based on the setting value of the read system setting information. In this step, the version processing control unit 206 identifies the version to be transferred to the file server apparatus 102, and stores the version information of the identified version to be transferred in the RAM.

The processing in step S1603 is described in detail below. In a case where the "document size" is designated in the system setting information, the version processing control unit 206 checks if the property value of "size" of the property information about the version that is not updated yet exceeds the value designated in the setting value 1203. If the property value exceeds the value in the setting value 1203, the version processing control unit 206 identifies the version as an object to be transferred, and stores the version in the RAM.

In a case where the "version number" is designated in the system setting information, the version processing control unit 206 acquires all versions that is not transferred yet to the file server apparatus 102 from the version information management unit 202 among the version information about the document designated by the user.

The version processing control unit 206 checks if the version number exceeds the value in the setting value 1203. If the version number exceeds the value, version processing control unit 206 identifies the version whose version number is the earliest in the acquired versions as the version to be transferred, and stores the version in the RAM.

In a case where the "storage time period" is designated in the system setting information, the version processing control unit 206 acquires all property values in the "update date and hour" from the property information about the version that is not yet transferred from the property information management unit 203 to the file server apparatus 102.

The version processing control unit 206 checks if the update date and hour is earlier than the time limit in the setting value 1203. If the update date and hour is earlier than the time limit in the setting value 1203, the version processing control unit 206 identifies the version as the version to be transferred, and stores the version in the RAM.

In step S1604, the version processing control unit 206 determines whether there is the version to be transferred that is stored in the RAM in step S1603. If the version processing control unit 206 determines that there is the version to be transferred (YES in step S1604), the processing proceeds to step S1605. If the version processing control unit 206 determines that there is no version to be transferred (NO in step S1604), the flow is ended.

In step S1605, the version processing control unit 206 confirms whether the folder for storing the past version corresponding to the designated document exists on the file server apparatus 102. More specifically, the version processing control unit 206 acquires the value of "past Ver path" of the property item of the document designated by the user, and determines whether path information exists in the value.

If the path information exists therein (YES in step S1605), the folder for storing the past version corresponding to the designated document exists on the file server apparatus 102, so that the processing proceeds to step S1608. If the path information does not exist (NO in step S1605), a folder needs to be created, so that the processing proceeds to step S1606.

In step S1606, the version processing control unit 206 creates a folder for a document in the file server apparatus 102. As illustrated in FIG. 4, the folder for a document is created as any bottommost folder in the predetermined created folder hierarchy.

The version processing control unit 206 generates path information for accessing the created folder hierarchy on the file server apparatus 102, and registers the generated path information in the "past Ver path" of the property name in the property value acquired in step S1601.

In step S1607, the version processing control unit 206 creates the version information file 406 illustrated in FIG. 8 under the folder created in the file server apparatus 102, and adds a document portion (document name and path on the document management server apparatus 101) thereto.

In step S1608, the version processing control unit 206 acquires the version to be transferred that is stored in the RAM in step S1603, and acquires the version information and the property information thereof from the version information management unit 202 and the property information management unit 203, respectively.

In step S1609, the version processing control unit 206 stores the file in the version information acquired in step S1608 in the predetermined folder of the file server apparatus 102. The file name when storing the file is the one in which the version number stored as version information changed into a character string, and the extension of the document is added thereto.

In step S1610, the version processing control unit 206 adds the property information acquired in step S1608 to the version information file 406 stored in the predetermined folder in the file server apparatus 102 to update the version information file 406.

In step S1611, the version processing control unit 206 deletes information about the version to be transferred that is registered in the document management server apparatus 101. The information to be deleted is the version information and the property information acquired in step S1608. The version processing control unit 206 deletes the information using the version information management unit 202 and the property information management unit 203, and ends the update processing.

<Document/Version Deletion Processing>

Figure 17:
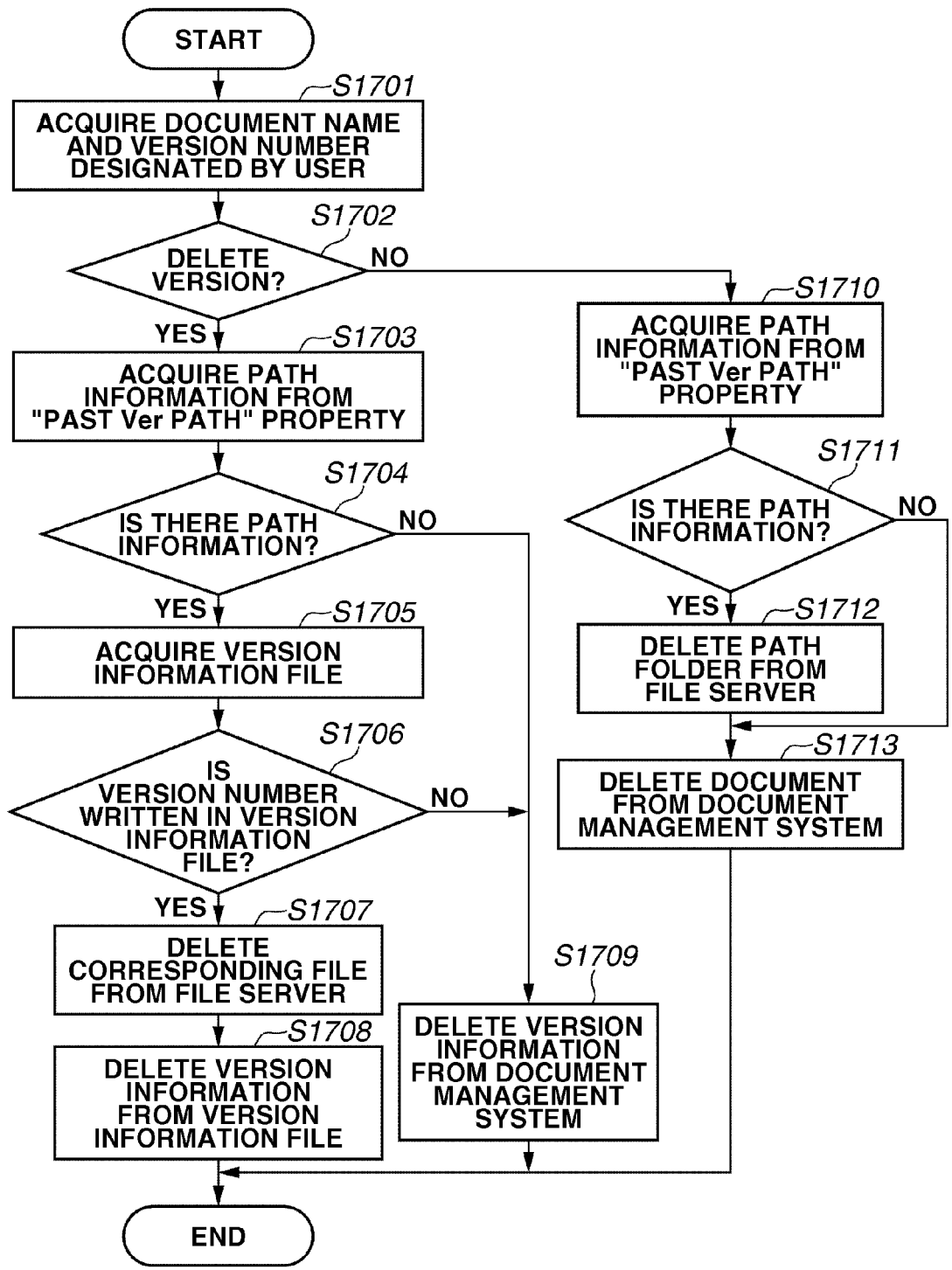
FIG. 17 is a flow chart illustrating a procedure for document deletion processing according to the second exemplary embodiment.

A procedure for deletion processing of a document or version by the document management server apparatus 101 is described below with reference to FIG. 17. FIG. 17 illustrates the process flow in pressing the deletion button in the following two states displayed on the CRT of the client apparatus 103.

One of the two states refers to a state where any document displayed on the document name list 1305 in the document management screen 1301 is selected. The other refers to a state where a version is selected on the version list 1404 in the version management screen 1401.

This processing is executed in the document registration processing control unit 204 and the version processing control unit 206 instructed by the CPU of the document management server apparatus 101 via the request processing control unit 208.

In step S1701, the version processing control unit 206 acquires information based on the information about a document and a version to be deleted designated by the user using the document information management unit 201, the version information management unit 202, and the property information management unit 203. The version processing control unit 206 stores the acquired document, version, and property information in the RAM.

In step S1702, the version processing control unit 206 determines whether an object to be deleted designated by the user is the whole document formed of at least one or more versions or any version included in the document. If the object to be deleted is a version (YES in step S1702), the processing proceeds to step S1703. If the object to be deleted is the document (NO in step S1702), the processing proceeds to step S1710.

In step S1703, the version processing control unit 206 acquires the property value of the "past Ver path" from the property information acquired in step S1701. In step S1704, the version processing control unit 206 confirms if path information exists in the property value acquired in step S1703. If the path information exists therein (YES in step S1704), the processing proceeds to step S1705. If the path information does not exist (NO in step S1704), the processing proceeds to step S1709.

In step S1705, the version processing control unit 206 acquires the version information file 406 from the folder of the file server apparatus 102 indicated by the path of the property value acquired in step S1703.

In step S1706, the version processing control unit 206 confirms if the version designated by the user exists in the version information written in the version information file 406 acquired in step S1705. If the version processing control unit 206 confirms that the version exists therein (YES in step S1706), the processing proceeds to step S1707. If the version processing control unit 206 confirms that the version does not exist (NO in step S1706), the processing proceeds to step S1709.

In step S1707, the version processing control unit 206 identifies the file to be deleted from the version information written in the version information file 406 acquired in step S1705, and deletes the file from the predetermined folder in the file server apparatus 102. In step S1708, the version processing control unit 206 deletes the version information written in the version information file 406 acquired in step S1705 from the version information file 406.

In step S1709, the version processing control unit 206 deletes the version information in the document management server apparatus 101. The information to be deleted is the version information in the version information management unit 202 and the property information associated with the version in the property information management unit 203.

In step S1710, the version processing control unit 206 acquires the property value of "past Ver path" from the property information acquired in step S1701. In step S1711, the version processing control unit 206 confirms if path information exists in the property information acquired in step S1710. If the path information exists therein (YES in step S1711), the processing proceeds to step S1712. If the path information does not exist (NO in step S1711), the processing proceeds to step S1713.

In step S1712, the version processing control unit 206 deletes the folder of the path written in the property acquired in step S1710 from the file server apparatus 102. In step S1713, the version processing control unit 206 deletes all data on the document management server apparatus 101 matching the document information acquired in step S1701. The following describes a delete procedure.

The version processing control unit 206 deletes data with the document ID matching the document designated by the user, which is stored in the property information management unit 203. Next, the version processing control unit 206 deletes data with the document ID matching the document designated by the user, which is stored in the version information management unit 202.

The version processing control unit 206 deletes data with the document ID matching the document designated by the user, which is stored in the document information management unit 201.

<Document File Acquisition Processing>

A procedure for acquisition processing of a document file by the document management server apparatus 101 is described below with reference to FIG. 18. FIG. 18 illustrates the process flow in pressing the acquisition button in the following two states displayed on the CRT of the client apparatus 103.

One of the two states refers to a state where any document displayed on the document name list 1305 in the document management screen 1301 is selected. The other refers to a state where a version is selected on the version list 1404 in the version management screen 1401. This processing is executed in the version processing control unit 206 instructed by the CPU of the document management server apparatus 101 via the request processing control unit 208.

In step S1801, the version processing control unit 206 acquires information based on the information about a document and a version to be acquired designated by the user using the document information management unit 201, the version information management unit 202, and the property information management unit 203. The version processing control unit 206 stores the acquired document information, version information, and property information in the RAM.

In step S1802, the version processing control unit 206 determines whether the file to be acquired based on the designation of the user is the file whose version is the latest. If the object designated by the user is a document (YES in step S1802), this means that the acquisition of the latest version is designated, so that the processing proceeds to step S1809.

If the object designated by the user is a version (NO in step S1802), the version processing control unit 206 determines whether the version number of the version is the largest in the version information acquired in step S1801. If the version processing control unit 206 determines that the version of the file is the latest (YES in step S1802), the processing proceeds to step S1809. If the version processing control unit 206 determines that the version of the file is not the latest (NO in step S1802), the processing proceeds to step S1803.

In step S1803, the version processing control unit 206 acquires the property value of the "past Ver path" from the property information acquired in step S1801.

In step S1804, the version processing control unit 206 confirms if path information exists in the property value acquired in step S1803. If the path information exists therein (YES in step S1804), the processing proceeds to step S1805. If the path information does not exist (NO in step S1804), the processing proceeds to step S1808.

In step S1805, the version processing control unit 206 acquires the version information file 406 from the folder of the file server apparatus 102 indicated by the path of the property value acquired in step S1803.

In step S1806, the version processing control unit 206 checks if the version designated by the user exists in the version information written in the version information file 406 acquired in step S1805. If the version processing control unit 206 confirms that the version exists therein (YES in step S1806), the processing proceeds to step S1807. If the version processing control unit 206 confirms that the version does not exist (NO in step S1806), the processing proceeds to step S1808.

In step S1807, the version processing control unit 206 identifies the file to be acquired from the version information written in the version information file 406, and acquires the file from the predetermined folder in the file server apparatus 102.

In step S1808, the version processing control unit 206 acquires the file matching the version in the document management server apparatus 101. The object to be acquired here is information holding the version number designated by the user in the version information management unit 202, and is acquired from the file 703.

In step S1809, the version processing control unit 206 acquires the file matching the version in the document management server apparatus 101. The object to be acquired here is information holding the latest version number of the document designated by the user in the version information management unit 202, and is acquired from the file 703.

In step S1810, the version processing control unit 206 transmits the entity of the file acquired in any of steps S1807, S1808, and S1809 to the client apparatus 103 of the request source via the network communication unit 209.

With the above configuration, the access efficiency is developed for the file acquisition by storing a file of a version accessed frequently into the database, and the operating cost can be reduced by storing a file of a version that is not accessed frequently into the file server. In addition, a user can change the setting condition of FIG. 12 depending on a operating environment flexibly.

A third exemplary embodiment of a document management system is described below. Unlike the first and second exemplary embodiments, the third exemplary embodiment is configured in such a manner that the document management function of the document management server apparatus 101 is extended to allow the designation of the file with the different type of an extension to individual versions in one document. In the third exemplary embodiment, only difference from the first and the second exemplary embodiment is described, so that the portions that are not specified in particular are similar to those of the first or second exemplary embodiment in configuration/procedure.

<Data Format to be Handled and Configuration>

The extended portion of data structure of the property information illustrated in FIG. 8 is described below with reference to FIG. 19. FIG. 19 is a table illustrating data formats and data examples handled by the document management server apparatus 101 in FIG. 2.

The data formats in FIG. 19 are similar to those in FIG. 8. The document ID 801, version 802, property name 803, and property value 804 correspond to the document ID 1901, version 1902, property name 1903, and property value 1904, respectively. Also, for the information stored as data examples, data 811 to 830 in FIG. 8 correspond to data 1911 to 1931 in FIG. 19, respectively.

The data 1930 stores ".DOC" and is different from the data 830 in FIG. 8. Difference of FIG. 19 from FIG. 8 is that the data 1932 is added to FIG. 19. This is because the property to be added at the time of registering the version whose extension is different is added in the third exemplary embodiment. A "real file name" as the property of the version 3 is registered differently from other versions.

<Document Update Processing>

Figure 20:
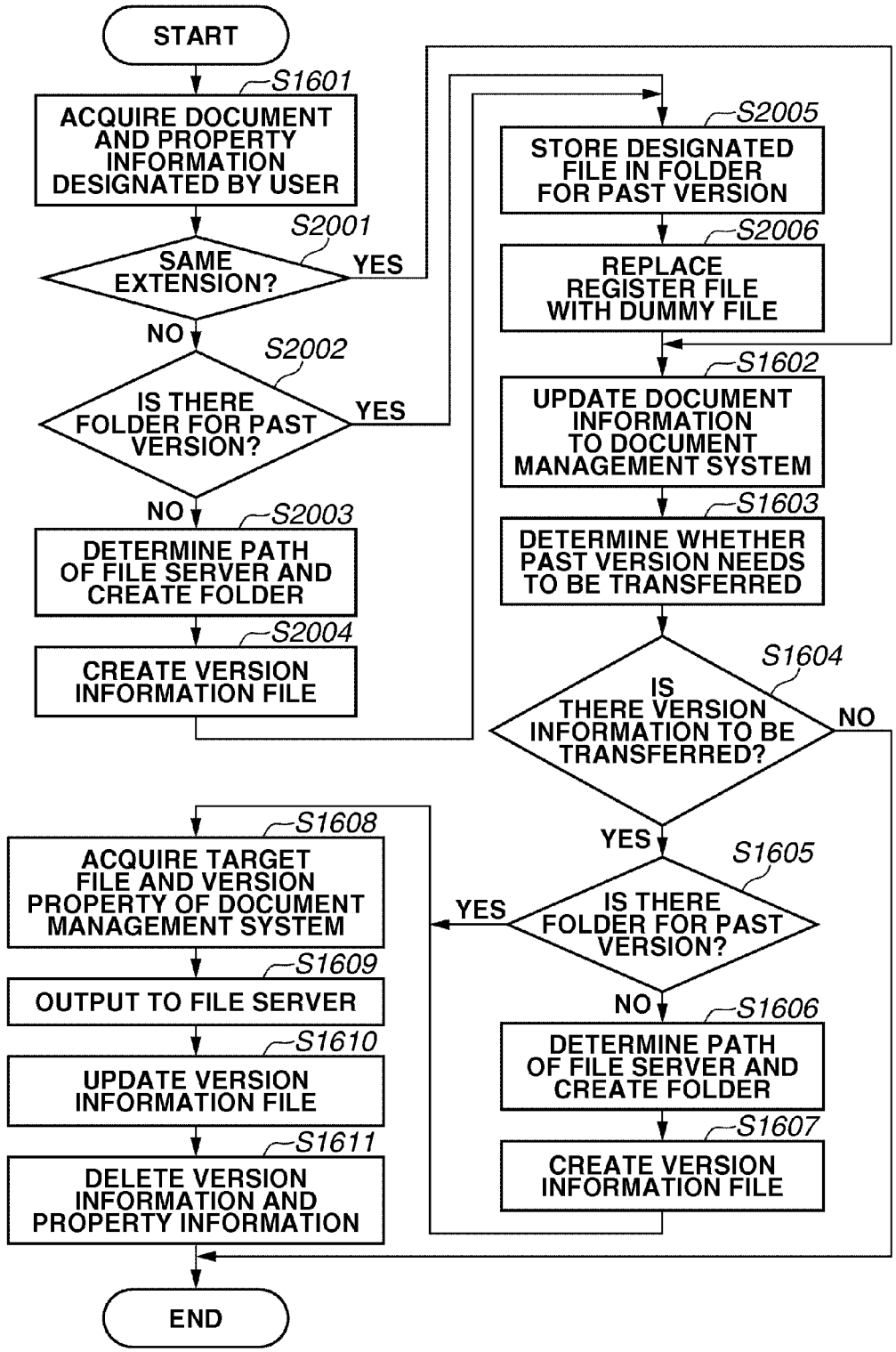
FIG. 20 is a flow chart illustrating a procedure for document update processing according to the third exemplary embodiment.

A procedure for update processing of a document by the document management server apparatus 101 is described below with reference to FIG. 20. FIG. 20 illustrates a processing flow in pressing the update button 1308 in a state where any document displayed on the document name list 1305 in the document management screen 1301 displayed on the CRT of the client apparatus 103 is selected.

The present exemplary embodiment in FIG. 20 is different from the exemplary embodiment in FIG. 16 in that the processing at the time of designating the file different in extension from the file registered until then is added. Other processings are performed similarly to those in FIG. 16. The steps similar to those in FIG. 16 are given the same reference numerals, so that the description thereof is omitted. In addition, this processing is executed in the version processing control unit 206 instructed by the CPU of the document management server apparatus 101 via the request processing control unit 208.

In step S2001, the version processing control unit 206 determines whether the extension of the document file acquired in step S1601 is the same as the file format information registered as the document information 611. If the version processing control unit 206 determines that the extension is the same (YES in step S2001), the processing proceeds to step S1602. If the version processing control unit 206 determines that the extension is different from the file format information (NO in step S2001), the processing proceeds to step S2002.

In step S2002, the version processing control unit 206 determines whether path information is set as the property value of the "past Ver path" in the property information acquired in step S2001. If the version processing control unit 206 determines that the path information exists (YES in step S2002), the folder for storing the past version file is already created, so that the processing proceeds to step S2005. If the version processing control unit 206 determines that the path information does not exist (NO in step S2002), the folder needs to be created, so that the processing proceeds to step S2003.

In step S2003, the version processing control unit 206 creates a folder for a document in the file server apparatus 102. As illustrated in FIG. 4. the folder for a document is created as any bottommost folder in the prescribed created folder hierarchy.

The version processing control unit 206 creates path information for accessing the created folder hierarchy on the file server apparatus 102, and registers the created path in the property name "past Ver path" in the property value acquired in step S2001.

In step S2004, the version processing control unit 206 creates the version information file 406 illustrated in FIG. 8 under the folder created in the file server apparatus 102, and adds a document portion (a document name and the path of the document management server apparatus 101) to the created file.

In step S2005, the version processing control unit 206 registers the file designated by the user in step S1601 in the folder of the path created in the file server apparatus 102 in step S2003, and registers the name of the file in the RAM.

In step S2006, the version processing control unit 206 replaces the file designated by the user with a dummy file previously prepared by the system to change the file to be registered in the document management server apparatus 101.

After that, the processing proceeds to step S1602 to register the document. If the processing passes step S2003, the property information is stored with the name of the file stored in the RAM added to the "real file name" of the property item name as property information to be registered.

The above processing allows a unified management by registering the file with a different extension in the file server apparatus 102 and the dummy file of the file in the document management server apparatus 101 even if the extension of a file is different in different versions of the same document. It is desirable to make the dummy file smaller in size than an actual file in order to save the memory capacity of the document management server apparatus 101.

(Document/Version Deletion Processing)

Figure 21:
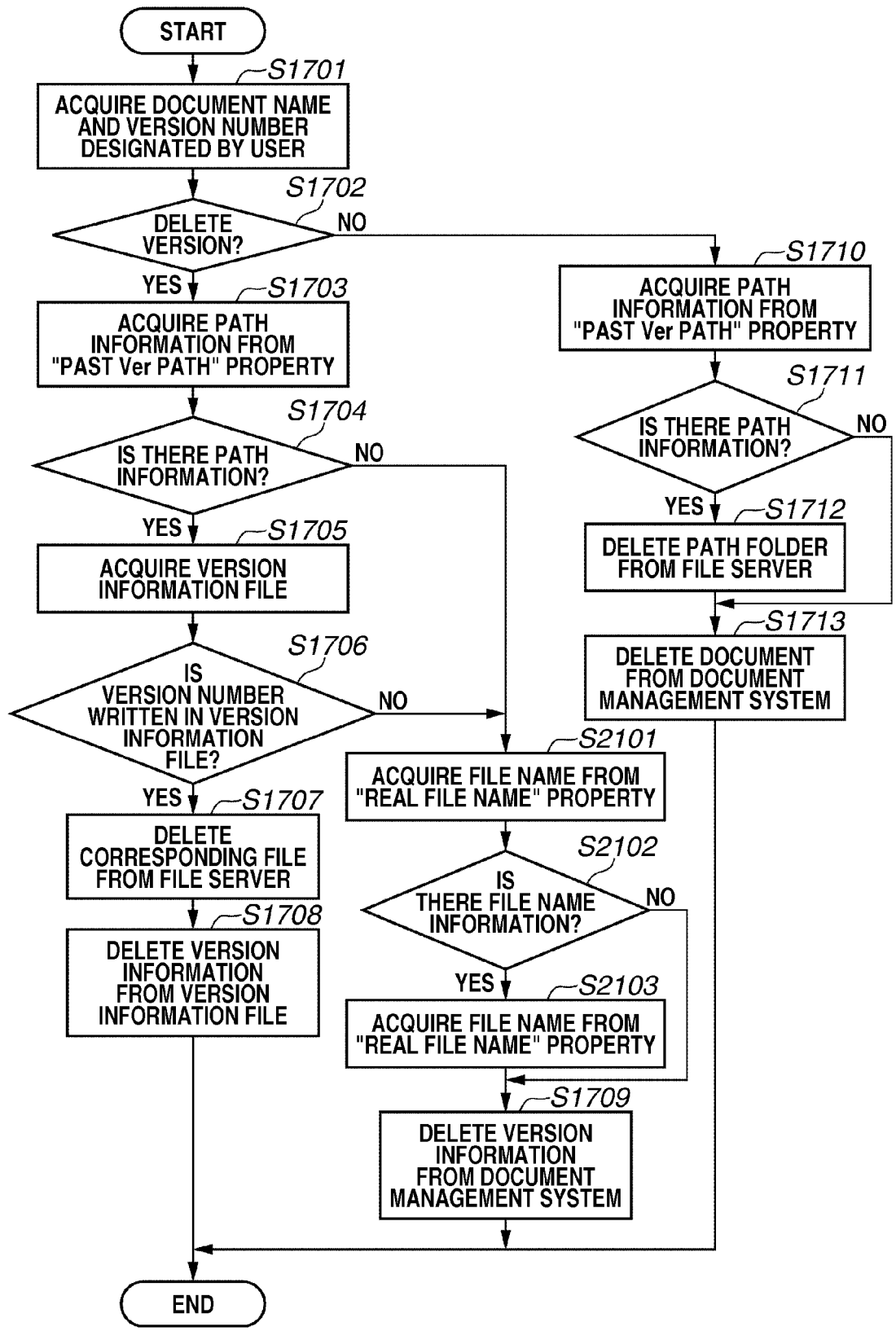
FIG. 21 is a flow chart illustrating a procedure for document deletion processing in the third exemplary embodiment.

A procedure for deletion processing of a document by the document management server apparatus 101 is described below with reference to FIG. 21. FIG. 21 illustrates the process flow in pressing the deletion button in the following two states displayed on the CRT of the client apparatus 103. One of the two states refers to a state where any document displayed on the document name list 1305 in the document management screen 1301 is selected. The other refers to a state where a version is selected on the version list 1404 in the version management screen 1401.

The present exemplary embodiment in FIG. 21 is different from the exemplary embodiment in FIG. 17 in that the processing for the case where the file extension of the version to be deleted is different from that of the initial registration version of the document, is added. Other processings are performed similarly to those in FIG. 17. The steps similar to those in FIG. 17 are given the same reference numerals, so that the description thereof is omitted. This processing is executed in the document registration processing control unit 204 and the version processing control unit 206 instructed by the CPU of the document management server apparatus 101 via the request processing control unit 208.

In step S2101, the version processing control unit 206 acquires the property value of the property name "real file name" of the corresponding version number from the property information acquired in step S1701.

In step S2102, the version processing control unit 206 confirms if the property value acquired in step S2101 exists. If the property value exists (YES in step S2102), the processing proceeds to step S2103. If the property value does not exist (NO in step S2102), the processing proceeds to step S1709.

In step S2103, the version processing control unit 206 deletes the file indicated by the value of property "real file name" acquired in step S2101, from the folder indicated by the value of property "pas Ver path" acquired in step S1703.

<Document File Acquisition Processing>

Figure 22:
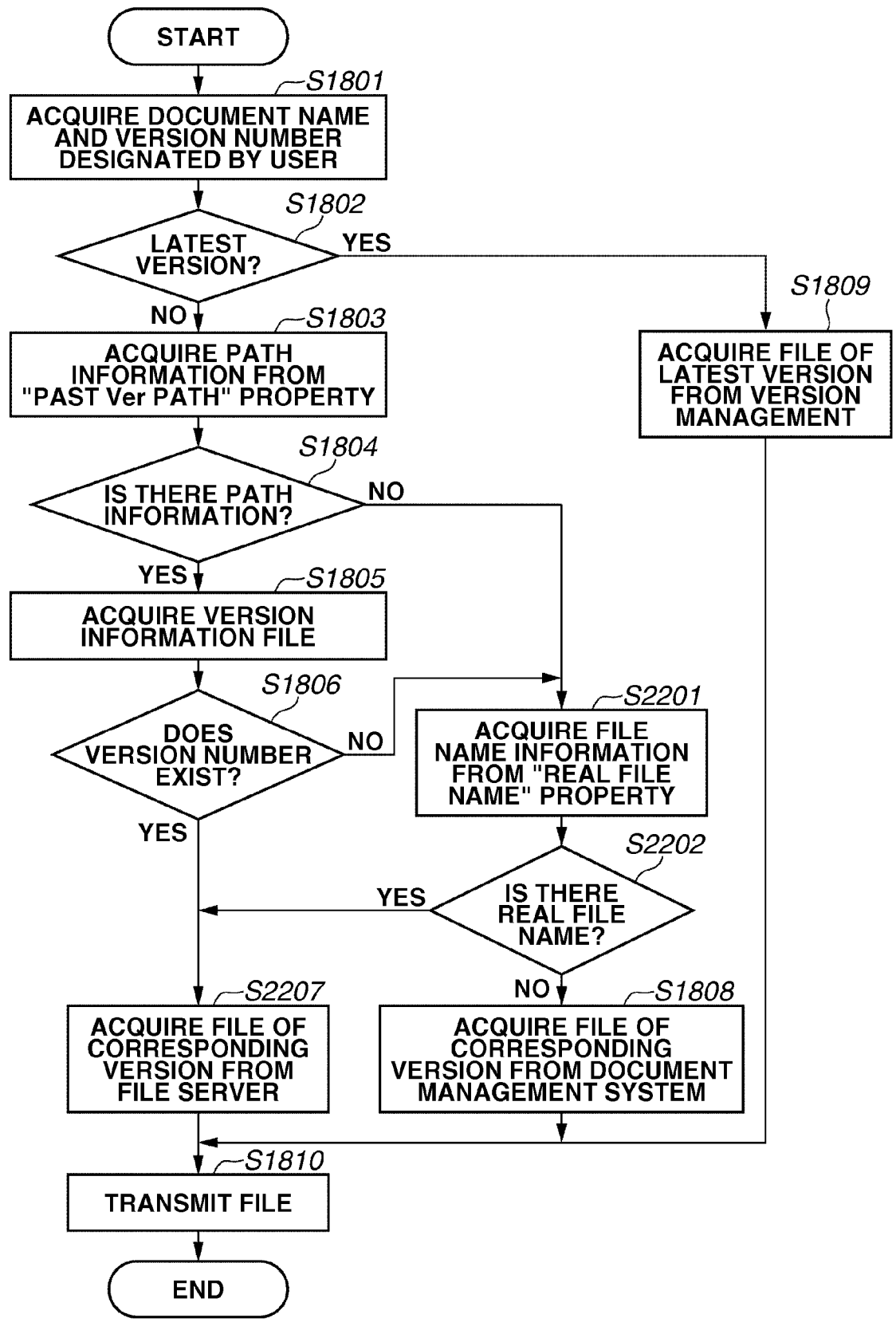
FIG. 22 is a flow chart illustrating a procedure for document file acquisition processing according to the third exemplary embodiment.

A procedure for acquisition processing of a document file by the document management server apparatus 101 is described below with reference to FIG. 22. FIG. 22 illustrates the process flow in pressing the acquisition button in the following two states displayed on the CRT of the client apparatus 103. One of the two states refers to a state where any document displayed on the document name list 1305 in the document management screen 1301 is selected. The other refers to a state where a version is selected on the version list 1404 in the version management screen 1401.

The present exemplary embodiment in FIG. 22 is different from the exemplary embodiment in FIG. 18 in that the processing for the case where the file extension of the version to be acquired is different from that of the initial registration version of the document, is added. Other processings are performed similarly to those in FIG. 18. The steps similar to those in FIG. 18 are given the same reference numerals, so that the description thereof is omitted. This processing is executed in the version processing control unit 206 instructed by the CPU of the document management server apparatus 101 via the request processing control unit 208.

In step S2201, the version processing control unit 206 acquires the property value of the property name "real file name" of the corresponding version number from the property information acquired in step S1801.

In step S2202, the version processing control unit 206 determines whether the property value acquired in step S2201 exists. If the version processing control unit 206 determines that the property value exists (YES in step S2202), the property value needs to be acquired from the file server apparatus 102, the processing proceeds to step S2207. If the version processing control unit 206 determines that the property value does not exist (NO in step S2202), the processing proceeds to step S1808.

In step S2207, in a case where the processing proceeds from step S2202, the processing is performed for acquiring the file with the file name indicated by the "real file name" property acquired in step S2201. In a case where the processing proceeds from step S1806, the same processing as that in step S1807 in FIG. 18 is performed.

This configuration can provide operation in a management function exceeding the function held by the document management function to allow a more flexible system to be provided.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-246428 filed Nov. 2, 2010, which is hereby incorporated by reference herein in its entirety.

What is claimed is:

1. A document management system including a first document management apparatus capable of managing a plurality of versions corresponding to one document and a file server which can be accessed by the first document management apparatus, wherein the first document management apparatus is different from the file server, the document management system comprising:
    a determination unit configured to determine whether a document transferred from a second document management apparatus includes a plurality of versions; and
    a registration unit configured to register a latest version of the document and first property information of the latest version of the document into a first folder of the first document management apparatus, wherein the registration unit further registers other versions than the latest version and second property information of the other versions into a second folder of the file server when the determination unit determines that the document transferred from the second document management apparatus includes a plurality of versions, and
    wherein the registration unit further registers path information of the second folder of the file server to the first property information when the determination unit determines that the document transferred from the second document management apparatus includes the plurality of versions, and
    wherein the registration unit does not register the path information of the second folder of the file server to the first property information when the determination unit determines that the document transferred from the second document management apparatus does not include a plurality of versions.

2. The document management system according to claim 1, further comprising a creation unit configured to create the second folder for storing the another version in the file server in a case where the second folder does not exist in the file server when the determination unit determines that the document transferred from the second document management apparatus includes a plurality of versions.

3. A method for controlling a document management system including a first document management apparatus capable of managing a plurality of versions corresponding to one document and a file server which can be accessed by the first document management apparatus, wherein the first document management apparatus is different from the file server, the method comprising:
    determining whether a document transferred from a second document management apparatus includes a plurality of versions; and
    registering a latest version of the document and first property information of the latest version of the document into a first folder of the first document management apparatus;
    registering other versions than the latest version and second property information of the other version into a second folder of the file server when it is determined that the document transferred from the second document management apparatus includes a plurality of versions;
    registering path information of the second folder of the file server to the first property information when determined that the document transferred from the second document management apparatus includes the plurality of versions; and
    not registering the path information of the second folder of the file server to the first property information when determined that the document transferred form the second document management apparatus does not include a plurality of versions.

4. The method for controlling the document management system according to claim 3, further comprising creating the second folder for storing the another version in the file server in a case where the second folder does not exist in the file server when determined that the document transferred from the second document management apparatus includes a plurality of versions.

5. A non-transitory computer-readable storage medium storing a program that causes a computer to function as the following units:
    a first document management apparatus capable of managing a plurality of versions corresponding to one document and a file server which can be accessed by the first document management apparatus, wherein the first document management apparatus is different from the file server, the document management system comprising:
a determination unit configured to determine whether a document transferred from a second document management apparatus includes a plurality of versions; and
a registration unit configured to register a latest version of the document and first property information of the latest version of the document into a first folder of the first document management apparatus, wherein the registration unit further registers other versions than the latest version and second property information of the other versions into a second folder of the file server when the determination unit determines that the document transferred from the second document management apparatus includes a plurality of versions, and wherein the registration unit further registers path information of the second folder of the file server to the first property information when the determination unit determines that the document transferred from the second document management apparatus includes the plurality of versions, and
wherein the registration unit does not register the path information of the second folder of the file server to the first property information when the determination unit determines that the document transferred from the second document management apparatus does not include a plurality of versions.

* * * * *